(12) United States Patent
James

(10) Patent No.: US 6,633,684 B1
(45) Date of Patent: Oct. 14, 2003

(54) DISTORTION-FREE IMAGE CONTRAST ENHANCEMENT

(75) Inventor: Brian G. James, Vernon (CA)

(73) Assignee: Athentech Technologies Corp., Calgary (CA)

(*) Notice: Subject to any disclaimer, the term of this patent is extended or adjusted under 35 U.S.C. 154(b) by 630 days.

(21) Appl. No.: 09/611,773

(22) Filed: Jul. 7, 2000

(51) Int. Cl.[7] ................................................. G06K 9/00
(52) U.S. Cl. .......................... 382/274; 345/63; 358/461; 382/131; 382/132; 382/168; 382/172
(58) Field of Search .................................. 382/274, 132, 382/131, 168, 172, 298, 270; 250/205; 345/20, 63, 77, 596–599, 690–697; 348/251, 254; 358/461

(56) References Cited

U.S. PATENT DOCUMENTS

| | | | |
|---|---|---|---|
| 4,975,970 A | 12/1990 | Zettel et al. | 382/131 |
| 4,991,092 A | 2/1991 | Greensite | 364/413.13 |
| 5,150,421 A | 9/1992 | Morishita et al. | 382/169 |
| 5,319,550 A | 6/1994 | Griffith | 364/413.19 |
| 5,357,549 A | 10/1994 | Maack et al. | 378/62 |
| 5,542,003 A | 7/1996 | Wofford | 382/132 |
| 5,592,571 A | 1/1997 | Peters | 382/261 |
| 5,633,511 A | 5/1997 | Lee et al. | 250/587 |
| 5,644,649 A | 7/1997 | Schoeters et al. | 382/132 |
| 5,715,334 A | 2/1998 | Peters | 382/261 |
| 5,734,740 A | 3/1998 | Benn et al. | 382/132 |
| 5,774,599 A | 6/1998 | Muka et al. | 382/254 |
| 5,796,865 A | 8/1998 | Aoyama et al. | 382/169 |
| 5,805,721 A | 9/1998 | Vuylsteke et al. | 382/128 |
| 5,825,909 A | 10/1998 | Jang | 382/132 |
| 5,835,618 A | 11/1998 | Fang et al. | 382/132 |
| 5,852,648 A * | 12/1998 | Miyamoto et al. | 378/62 |
| 5,905,820 A | 5/1999 | Cushman et al. | 382/299 |
| 5,923,383 A | 7/1999 | Kim | 348/672 |
| 5,946,407 A | 8/1999 | Bamberger et al. | 382/132 |
| 5,963,665 A | 10/1999 | Kim et al. | 382/169 |
| 5,963,676 A | 10/1999 | Wu et al. | 382/274 |
| 5,991,432 A * | 11/1999 | Ortyn et al. | 382/128 |
| 6,173,083 B1 * | 1/2001 | Avinash | 382/260 |
| 6,341,172 B1 * | 1/2002 | Xu et al. | 382/132 |
| 6,343,158 B1 * | 1/2002 | Shiohara | 382/261 |
| 6,411,416 B1 * | 6/2002 | Ooi et al. | 398/141 |
| 6,449,584 B1 * | 9/2002 | Bertrand et al. | 702/180 |
| 6,546,124 B1 * | 4/2003 | Hopple et al. | 382/133 |
| 2002/0044676 A1 * | 4/2002 | Wei et al. | 382/132 |

\* cited by examiner

Primary Examiner—Bhavesh M. Mehta
Assistant Examiner—Barry Choobin
(74) Attorney, Agent, or Firm—Sheridan Ross PC

(57) ABSTRACT

An image, such as an X-ray, is enhanced through local enhancement of the contrast of the image's point intensities. A first, low frequency upper curve is fitted to the local maximums and a second independent, low frequency lower curve is fit to the local minimums, forming a fairway with the raw image data residing therebetween. A local range, between the fairway local maximum intensity and fairway local minimum intensity, is extracted for each point. Each point is scaled by the ratio between the fairway's local range and the dynamic range for the image so as to maximize its variation in intensity between it and its neighboring points. Preferably an iterative moving average technique is used to establish the fairway curves. In a preferred embodiment, outlier points scaled outside the fairway are temporarily stored at higher precision than the dynamic range. A histogram of the fairway corrected data is formed, having a range greater than the dynamic range and encompassing substantially all the outlier points. Only the most deviant of the outliers are trimmed in this histogram correction and the resulting range limits for the entire image are scaled to the dynamic range.

19 Claims, 30 Drawing Sheets

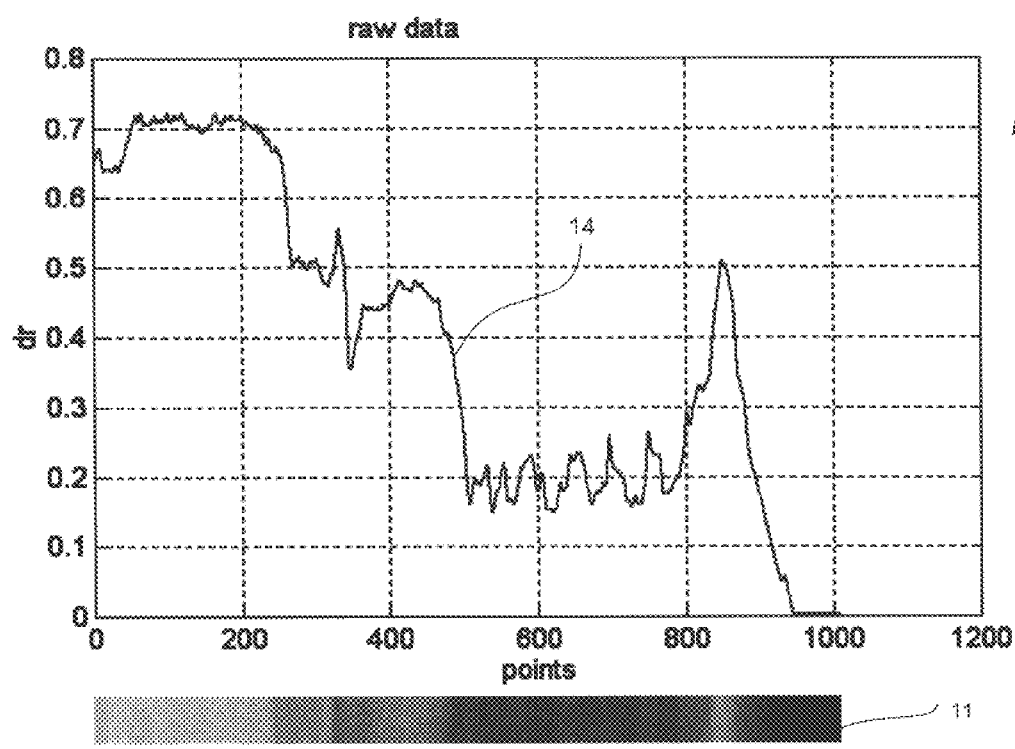

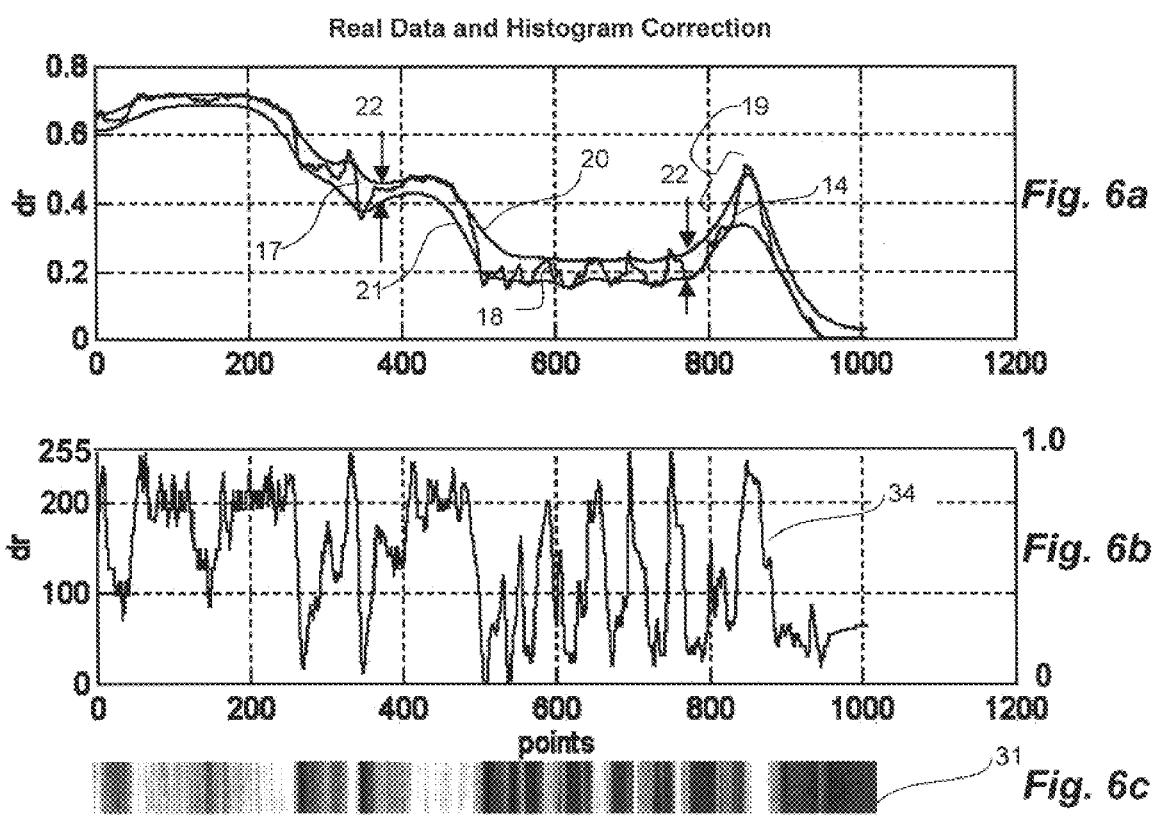

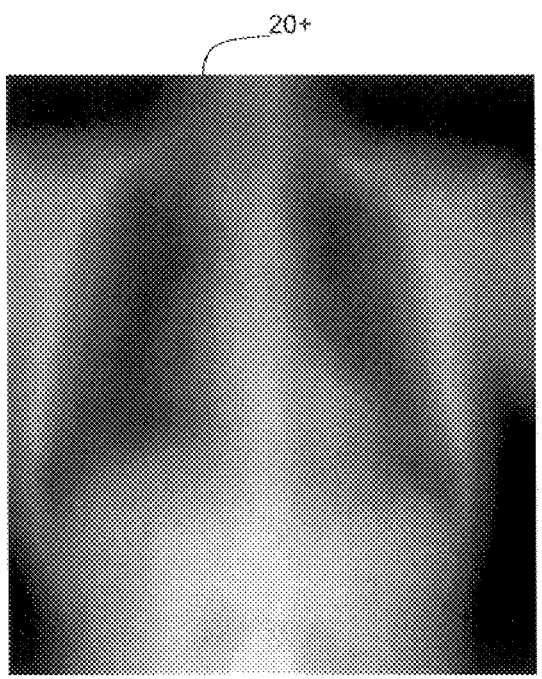 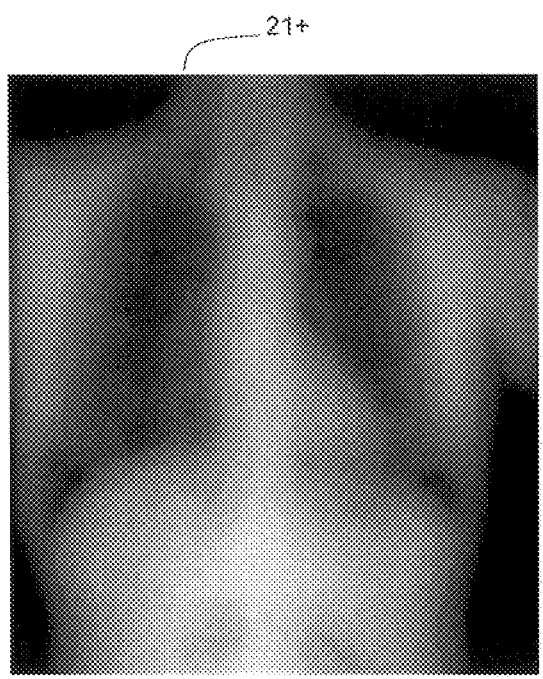
*Fig. 8a*  *Fig. 8b*

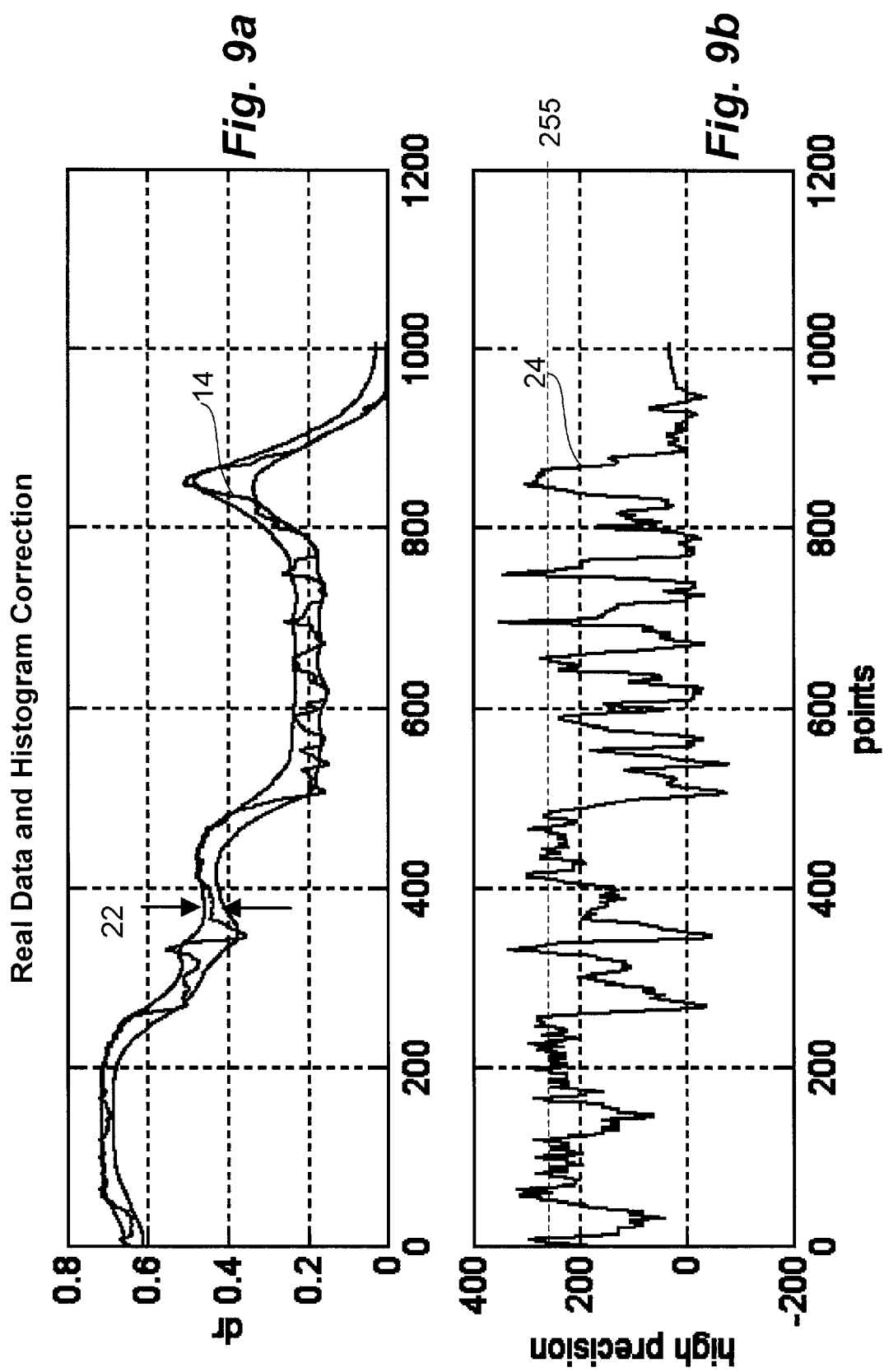

Fig. 13a

EFFICIENT MOVING AVERAGE
(J3(Sub) -effc_2dma(imag(), rows, rows_pad, cols, cols_pad, stot()

A - Total image Dimensions - Mirrored Image
```
    rmin = 1 - rows_pad ; rmax = rows + rows_pad
```

B - 2D Filter box dimension (in Columns)
```
    icol = 1
    c2bg = icol - cols_pad ; c2en = icol + cols_pad
```

C - Increment Rows & Store Filter Box Col sums for First Col points
```
    For irow = rmin To rmax
     stot(icol, irow) = 0
     For ico2 = c2bg To c2en
       stot(icol, irow) = stot(icol, irow) + imag(ico2, irow)
     Next ico2
    Next irow
```
Rest of Cols
```
    For icol = 2 To cols
     ico3 = icol - 1 ; ico4 = icol + cols_pad ; ico5 = ico3 - cols_pad
     For irow = rmin To rmax
       stot(icol, irow)=stot(ico3, irow)+imag(ico4, irow)-imag(ico5, irow)
     Next irow
    Next icol
```

D - Sum Filter Box Intensity using SubTotals
<u>1st row</u>
```
    irow = 1
    r2bg = irow - rows_pad ; r2en = irow + rows_pad
    For icol = 1 To cols
     imag(icol, irow) = 0
     For iro2 = r2bg To r2en
       imag(icol, irow) = imag(icol, irow) + stot(icol, iro2)
     Next iro2
    Next icol
```
Rest of Rows
```
    For irow = 2 To rows
     iro3 = irow - 1
     iro4 = irow + rows_pad ; iro5 = iro3 - rows_pad
     For icol = 1 To cols
       imag(icol, irow)=imag(icol, iro3)+stot(icol, iro4)-stot(icol, iro5)
     Next icol
    Next irow
```

E - Normalize Smoothed Surface
```
    npts = (cols_pad + cols_pad + 1) * (rows_pad + rows_pad + 1)
    For icol = 1 To cols
     For irow = 1 To rows
       imag(icol, irow) = imag(icol, irow) / npts
     Next irow
    Next icol
```

*Fig. 13f*

Where:
- cols_pad   is the number of column points to be averaged on each side of the box center
- cols       is the number of columns in the image
- rows_pad   is the number of row points to be averaged on each side
- rows       is the number of rows in the image
- rmin       is the minimum row index for mirrored data
- rmax       is the maximum row index for mirrored data
- icol       is the column index
- ico2       is the second column index
- ico2       is the second column index
- ico3       is the third column index
- ico4       is the fourth column index
- ico5       is the fifth column index
- irow       is the row index
- iro2       is the second row index
- iro3       is the third row index
- iro4       is the fourth row index
- iro5       is the fifth row index
- c2bg       is the 2nd column index beginning
- c2mx       is the 2nd column index beginning
- rmin       is the minimum row index for mirrored data
- rmax       is the maximum row index for mirrored data
- r2bg       is the second row index beginning value
- r2en       is the second row index ending value
- npts       is the number of points summed
- imag       is the array that initially holds the input with mirroring and upon output holds the moving average without mirror
- stot       is the array that holds the column sub-totals

Fig. 14a

ITERATIVE CONVERGENCE

F - calculate pad lengths
```
rows_pad = imag_pcnt * rows / 100 / 2
cols_pad = imag_pcnt * cols / 100 / 2
```

G - define arrays limits
```
cmin = -cols_pad + 1
cmax = cols + cols_pad
rmin = -rows_pad + 1
rmax = rows + rows_pad
' array usage
' imag_wrk1: raw input data
' imag_wrk2: current estimate of upper surface
' imag_wrk3: current estimate of lower surface
' imag_wrk4: partial sums
' ReDim imag_wrk1(1 To cols, 1 To rows)
ReDim imag_wrk2(cmin To cmax, rmin To rmax)
ReDim imag_wrk3(cmin To cmax, rmin To rmax)
ReDim imag_wrk4(cmin To cmax, rmin To rmax)
```

H - the "zeroth" iteration
```
'  copy in raw data to wrk2, mirror, find moving average and copy to wrk3
For icol = 1 To cols
 For irow = 1 To rows
   imag_wrk2(icol, irow) = imag_wrk1(icol, irow)
 Next irow
Next icol
Call data_mirr(imag_wrk2(), rows, rows_pad, cols, cols_pad)
Call effc_2dma(imag_wrk2(), rows, rows_pad, cols, cols_pad, imag_wrk4())
For icol = 1 To cols
 For irow = 1 To rows
   imag_wrk3(icol, irow) = imag_wrk2(icol, irow)
 Next irow
Next icol
```

I - set up variables needed in iteration loop
```
frat = 5 * cols * rows / 100
upps_min = surf_mdff
lows_max = drlm - surf_mdff
```

Fig. 14b

J - set up the iteration loop
```
itri = 0; itrf = yes
Do Until itrf = no
 itri = itri + 1
```

J1 - create current artificial data sets by replacement
```
For icol = 1 To cols
  For irow = 1 To rows
    If imag_wrk2(icol, irow) < imag_wrk1(icol, irow) Then
      imag_wrk2(icol, irow) = imag_wrk1(icol, irow)
    End If
    If imag_wrk3(icol, irow) > imag_wrk1(icol, irow) Then
      imag_wrk3(icol, irow) = imag_wrk1(icol, irow)
    End If
  Next irow
Next icol
```

J2 - mirror pad artificial data (Fig. 14c)
```
Call data_mirr(imag_wrk2(), rows, rows_pad, cols, cols_pad)
Call data_mirr(imag_wrk3(), rows, rows_pad, cols, cols_pad)
```

J3 - calculate current moving averages (Fig. 13a)
```
Call effc_2dma(imag_wrk2(),rows,rows_pad,cols,cols_pad,imag_wrk4())
Call effc_2dma(imag_wrk3(),rows,rows_pad,cols,cols_pad,imag_wrk4())
```

J4 - force the minimum difference between the two surfaces
```
For icol = 1 To cols
  For irow = 1 To rows
    diff = surf_mdff - (imag_wrk2(icol, irow) - imag_wrk3(icol, irow))
    If diff >= 2 Then
      xdif = diff / 2
      imag_wrk2(icol, irow) = imag_wrk2(icol, irow) + xdif
      imag_wrk3(icol, irow) = imag_wrk3(icol, irow) - xdif
    End If
    If imag_wrk2(icol, irow)<upps_min Then
imag_wrk2(icol,irow)=upps_min
    If imag_wrk2(icol, irow) > drlm Then imag_wrk2(icol, irow) =drlm
    If imag_wrk3(icol, irow) < 0 Then imag_wrk3(icol, irow) = 0
    If imag_wrk3(icol, irow)>lows_max Then
imag_wrk3(icol,irow)=lows_max
  Next irow
Next icol
```

J5 - find failure rate
```
fpos = 0; fneg = 0
For icol = 1 To cols
  For irow = 1 To rows
    If imag_wrk1(icol,irow)>imag_wrk2(icol,irow) Then fpos = fpos + 1
    If imag_wrk1(icol,irow)<imag_wrk3(icol,irow) Then fneg = fneg + 1
  Next irow
Next icol
```

J6 - loop statement ends iteration if iteration flag = no
```
If fpos < frat AND fneg < frat Then itrf = no
If itri >= 10 Then itrf = no
```

```
Loop '(J1-J6)
```

Fig. 14c

SUBROUTINES

J2(Sub) - data mirr(imag(), rows, rows_pad, cols, cols_pad)

```
' mirror pad columns
' beginning
For icol = 1 To cols_pad
 ico2 = 1 - icol
 For irow = 1 To rows
   imag(ico2, irow) = imag(icol, irow)
 Next irow
Next icol
' end
c2of = cols + cols + 1
For icol = cols - cols_pad + 1 To cols
 ico2 = c2of - icol
 For irow = 1 To rows
   imag(ico2, irow) = imag(icol, irow)
 Next irow
Next icol ' mirror pad rows
cbeg = 1 - cols_pad
cend = cols + cols_pad
' beginning
For irow = 1 To rows_pad
 iro2 = 1 - irow
 For icol = cbeg To cend
   imag(icol, iro2) = imag(icol, irow)
 Next icol
Next irow
' end
r2of = rows + rows + 1
For irow = rows - rows_pad + 1 To rows
 iro2 = r2of - irow
 For icol = cbeg To cend
   imag(icol, iro2) = imag(icol, irow)
 Next icol
Next irow End Sub
```

Where (Main Routines A-J):

- cols — is the number of columns in the image
- rows — is the number of rows in the image
- cmin — is the minimum column index for mirrored data
- cmax — is the maximum column index for mirrored data
- rmin — is the minimum row index for mirrored data
- rmax — is the maximum row index for mirrored data
- cols_pad — is the number of column points to be averaged on each side also the number of columns to mirror each side
- rows_pad — is the number of row points to be averaged on each side also the number of rows to mirror each side
- icol — is the column index
- irow — is the row index
- imag_pcnt — holds the percentage of image size (one dimensional) to be used for low frequency estimation (moving average)
- frat — is the acceptable failure rate on either surface arbitrarily set to 5%
- upps_min — is the upper surface minimum value
- drlm — is the dynamic range upper limit (255, 1023, 4095)
- surf_mdff — holds the minimum allowable difference between surfaces Signal to Noise management issue
- lows_max — is the lower surface maximum value
- itri — is the iteration index, holds number of iterations
- itrf — is the iteration flag if yes iteration continues if no iteration ends
- yes — is the yes variable, holds word "yes"
- no — is the no variable, holds word "no"
- diff — is the value needed to reach the minimum surface separation
- xdif — is half the value of diff this value needed to add/subtract to surfaces
- fpos — is the failure rate of data samples in positive sense, above upper surface
- fneg — is the failure rate of data samples in negative sense, below lower surface
- imag_wrk1 — is the array that already holds the raw input image
- imag_wrk2 — is the array that holds current estimate of upper surface
- imag_wrk3 — is the array that holds current estimate of lower surface
- imag_wrk4 — is the array that is used for column sub-totals

Additional Definitions for Subroutines J2 - Where:

- c2of — column index 2 offset
- cbeg — column index beginning
- cend — column index end
- ico2 — is the second column index
- imag — is the array - holds the image and the edge mirroring
- iro2 — is the second row index
- r2of — row index 2 offset
- stot — is the array that holds the column sub-totals

<u>J1(B) - Improved Convergence</u>

```
   create current artificial data sets by replacement amplification
corr_max = 0.2 * drlm
itr2 = itri - 1
For icol = 1 To cols
 For irow = 1 To rows
   dupp = imag_wrk1(icol, irow) - imag_wrk2(icol, irow)
   If dupp > 0 Then
    uppr_corr = itr2 * dupp
    if uppr_corr > corr_max then uppr_corr = corr_max
    imag_wrk2(icol, irow) = imag_wrk1(icol, irow) + uppr_corr
    if imag_wrk2(icol, irow) > drlm then imag_wrk2(icol, irow)=drlm
   End If
   dlow = imag_wrk1(icol, irow) - imag_wrk3(icol, irow)
   If dlow < 0 Then
    lowr_corr = Abs(itr2 * dlow)
    if lowr_corr > corr_max then lowr_corr = corr_max
    imag_wrk3(icol, irow) = imag_wrk1(icol, irow) - lowr_corr
    if imag_wrk3(icol, irow) < 0 then imag_wrk3(icol, irow) = 0
   End If
 Next irow
Next icol
```

Where:
- Cols         is the number of columns in the image
- rows         is the number of rows in the image
- corr_max     is the maximum allowable extra correction
              Arbitrarily set to 20% of dynamic range
- dupp         is the difference between input and upper bound
              surface
- uppr_corr    is the extra correction applied to the upper bound
              data
- drlm         is the dynamic range upper limit (255, 1023, 4095)
- dlow         is the difference between input and lower bound
- lowr_corr    is the extra correction applied to the lower bound
              data
- itri         is the count of the iteration
- itr2         is the count of the iteration subtract 1 variable
              used to store repeated calculation
- icol         is the column index
- irow         is the row index
- imag_wrk1    is the array that already holds the raw input image
- imag_wrk2    is the array that holds current estimate of upper
              surface
- imag_wrk3    is the array that holds current estimate of lower
              surface is the array that holds current estimate
              of lower surface

Fig. 18a

R - first correction
```
For icol = 1 To cols
  For irow = 1 To rows
    imag_wrk4(icol, irow)=((imag_wrk1(icol, irow)-
             imag_wrk3(icol,irow)) /
             (imag_wrk2(icol,irow)- imag_wrk3(icol,irow)))*drlm
  Next irow
Next icol
```

S - Second Correction - dimension and zero histogram array
```
drl2 = drlm + drlm
Dim hist(-drlm, drl2)
For ihst = -drlm to drl2
  hist(ihst) = 0
Next ihst
```

T - building the histogram
```
For icol = 1 To cols
  For irol = 1 To rows
    Select Case imag_wrk4(icol, irow)
      Case Is < -drlm
        hist(-drlm) = hist(-drlm) + 1
      Case Is > drl2
        hist(drl2) = hist(drl2) + 1
      Case Else
        hist(imag_wrk4(icol, irow)) = hist(imag_wrk4(icol, irow)) + 1
    End Select
  Next irow
Next icol
```

U - setting the trimming rate, set to 1%
```
trat = cols * rows \ 100
```

V - finding the lower data trimming point
```
rtot = 0
itrm_low = -drlm - 1
Do Until rtot > trat
  itrm_lowr = itrm_lowr + 1
  rtot = rtot + hist(itrm_lowr)
Loop
If itrm_lowr > -drlm Then itrm_lowr = itrm_lowr - 1
```

W - finding the upper data trimming point
```
rtot = 0
itrm_uppr = drl2 + 1
Do Until rtot > trat
  itrm_uppr = itrm_uppr - 1
  rtot = rtot + hist(itrm_uppr)
Loop
If itrm_uppr < drl2 Then itrm_uppr = itrm_uppr + 1
```

X - SCALING AND TRIMING

Fig. 18b

X1 - trim levels set to full dynamic range

```
itrm_rang = itrm_uppr - itrm_lowr
For icol = 1 To cols
 For irow = 1 To rows
   imag_wrk4(icol, irow) = ((imag_wrk4(icol, irow) - itrm_lowr) \
                    itrm_rang) * drlm
   If imag_wrk4(icol, irow) > drlm Then imag_wrk4(icol, irow) =
drlm
   If imag_wrk4(icol, irow) < 0 Then imag_wrk4(icol, irow) = 0
 Next irow
Next icol
```

OR

X2 - trim levels set to only 75% of dynamic range

```
itrm_rang = itrm_uppr - itrm_lowr
outp_rang = 75 * drlm \ 100
outp_offs = 20 * drlm \ 100
For icol = 1 To cols
 For irow = 1 To rows
   imag_wrk4(icol, irow) = outp_rang * (imag_wrk4(icol, irow) -
itrm_lowr) \ itrm_rang + outp_offs
   If imag_wrk4(icol, irow) > drlm Then imag_wrk4(icol, irow) =
drlm
   If imag_wrk4(icol, irow) < 0 Then imag_wrk4(icol, irow) = 0
 Next irow
Next icol
```

Fig. 18c

Where:

- Drlm            is the dynamic range limit
- drl2            is twice the dynamic range limit
- cols            is the number of columns in the image
- rows            is the number of rows in the image
- icol            is the column index
- irow            is the row index
- ihst            is the histogram index
- rtot            is the running total of the histogram
- trat            is the acceptable trim rate on each edge arbitrarily set to 1% with full use of dynamic range
- itrm_uppr       is the upper limit trim value
- itrm_lowr       is the lower limit trim value
- itrm_rang       is the trim limit range repeated calculation stored for efficiency
- outp_rang       is the part of the dynamic range to which the trim points are scaled to (set to 75%)
- outp_offs       is the offset part of the dynamic range (20%) to avoid using because of eye insensitivity
- imag_wrk1       is the array that holds the raw input image
- imag_wrk2       is the array that holds current estimate of upper surface
- imag_wrk3       is the array that holds current estimate of lower surface
- imag_wrk4       is the array that holds the corrected image
- hist            is the array that holds histogram of 1st order correction

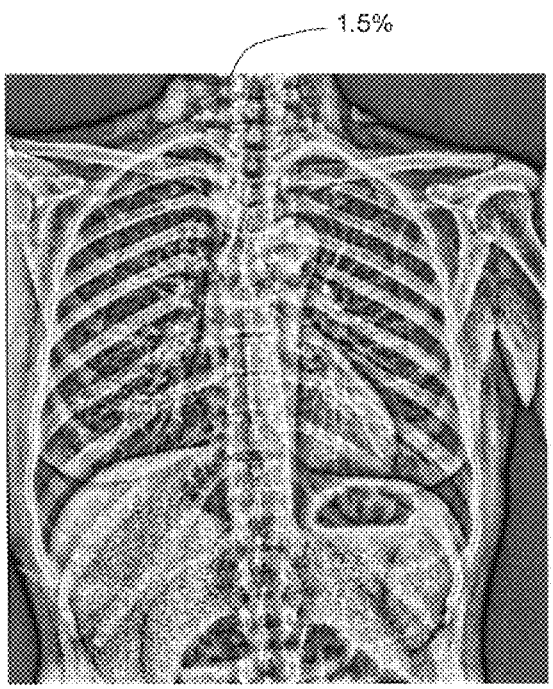 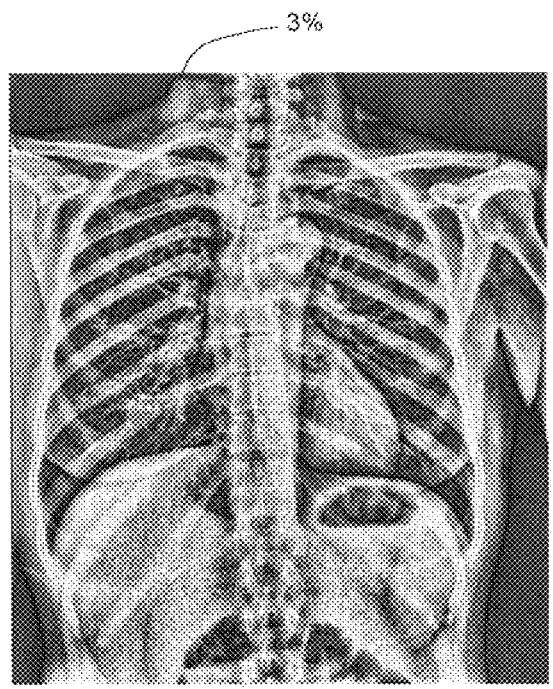
*Fig. 19*  *Fig. 20a*

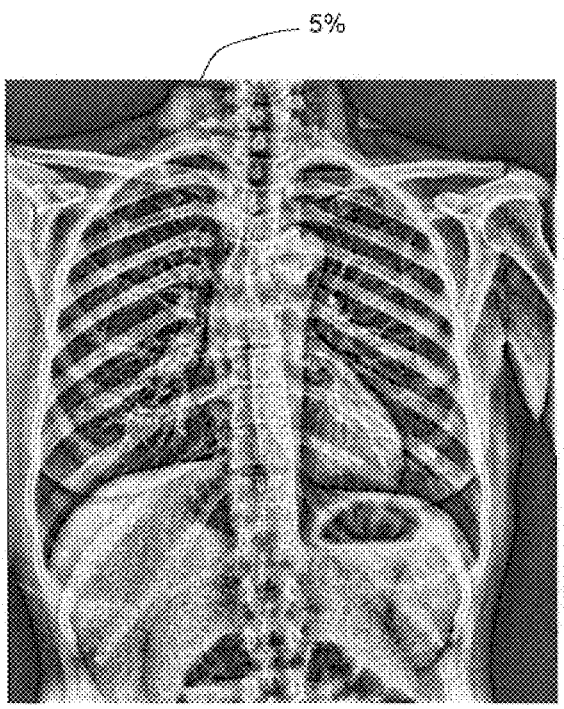
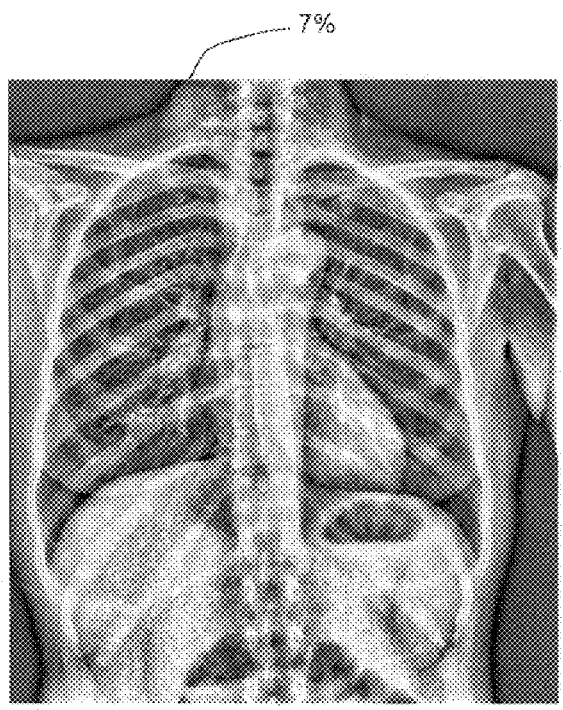
*Fig. 22*  *Fig. 23*

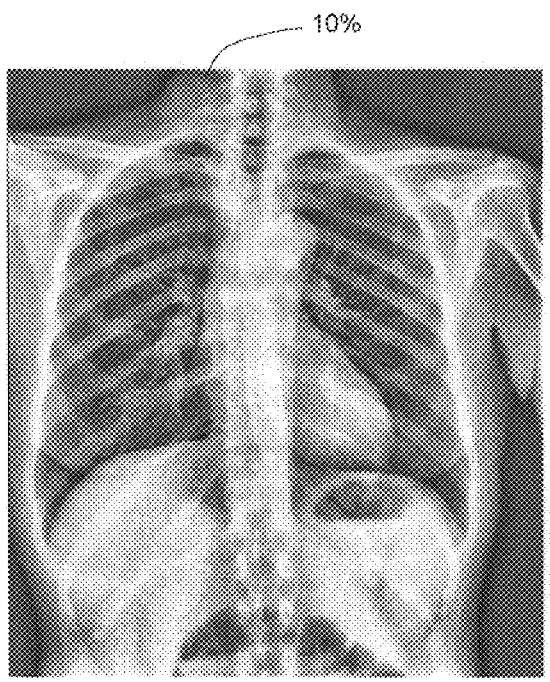
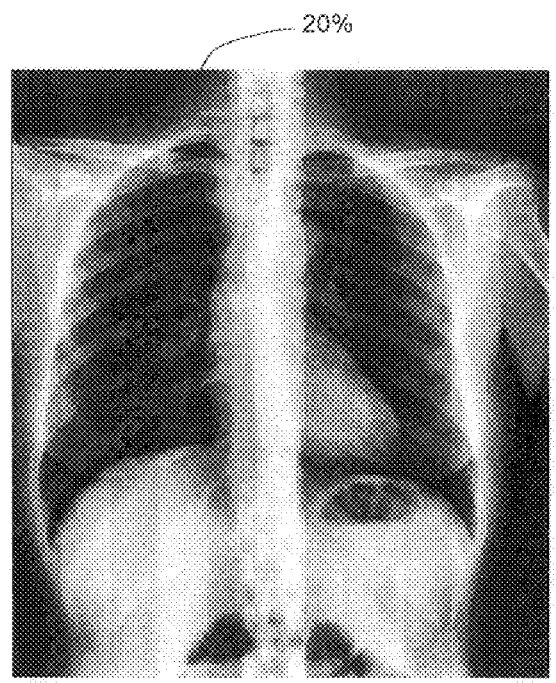
*Fig. 24*  *Fig. 25*

DISTORTION-FREE IMAGE CONTRAST ENHANCEMENT

FIELD OF THE INVENTION

The present invention relates to methods for improving the contrast between neighboring data in digital X-ray images. More particularly, the method determines the actual contrast between neighboring digital image data and stretches each point's intensity to the image's dynamic range without distorting the image.

BACKGROUND OF THE INVENTION

An X-ray image is typically with standard X-ray machines using film photography. In these cases the resulting X-ray image is turned into a computer file by the use of digital scanning technology. More recently, there are X-ray machines that use a bank of light-sensitive sensors for directly capturing a digital version of the X-ray image. The X-ray image is used as a medical diagnostic tool. While there are other related imagery processes that are superior, in particular CAT scans and MRI-s, X-ray images are still widely used and comprise the majority of such images and this is very likely to continue because they are comparatively inexpensive. The current invention improves the usefulness of X-ray images to doctors.

Due, in part, to practical limits involved with X-ray imaging, it is difficult to provide an image which both defines variations in density within adjacent soft tissues like lung and variations within adjacent dense tissues like bone. Variations are demonstrated by changes in intensity. Each digital image is associated with a dynamic range. Once developed (for film) or digitally rendered as a positive image, bright intensity (usually depicted as white) areas of dense matter typically occupy the high end of the dynamic range and low intensity (black) occupy the lower end of the dynamic range. While the imaging methods may indeed capture subtle variations, the intensity between such variations are not readily detectable by the human eye. This situation is further worsened when film images, traditionally transilluminated in a light box are converted to digital images and displayed on a digital display. In other words, variation within the black areas and variations within the white areas are not easily distinguished.

Accordingly, methods are known for improving the contrast in digital X-ray images, the most well-known of which is contrast stretching. Various methods for means of accomplishing contrast stretching are the subject of several issued patents.

For instance in U.S. Pat. No. 5,357,549 to Maack et al. (Maack), a technique is provided for stretching image intensity in only a particular area of interest—such as the lung area of a chest X-ray. Maack refers to this as dynamic range compression. Maack locates low frequency components, determines equalization factors and applies them to the image for compressing low frequency components; thus leaving the remainder of the dynamic range available for higher frequency areas of the image intensities. This approach is unable to enhance more than one image intensity area which has been selected and is of immediate interest to the diagnostician, with loss of data the other areas.

U.S. Pat. No. 5,835,618 to Fang improves on Maack using a method of dynamic range remapping for enhancing the image in both dark and bright intensity areas. This remapping or correction technique amounts to smoothing the data (such as through a low-pass filter), determining the data mean, adjusting the smoothed data to the mean, and then applying that smoothed, adjusted data to the original data. Two curves of adjusted data are provided, each offset from the mean, one of which is offset upwardly by a constant ($\Delta 1$) and one downwardly by a constant ($\Delta 2$) for establishing upper and lower thresholds and separating the data into two distinct populations. Constants $\Delta 1$, $\Delta 2$ define a range. Then, separate additive or multiplicative algorithms are applied firstly to the original data within the range, and secondly to data outside the range. For instance, in the additive option, the original data within the range is adjusted by the difference in the data's original and mean intensity, this difference being scaled by a user-defined control parameter between 0 and 1. Then the adjusted data is scaled to the full dynamic range of the image. Data outside the range is adjusted using a different algorithm.

Unfortunately, the method of Fang treats data within and without the range differently with the result that artificial details and other distortions result, such as the creation of a discontinuity at the range boundary. Data just inside the range data just outside the range can result in very different values, distorting stronger signals. The adjusting algorithms produce these distortions whenever the smoothed image deviates from the mean of the entire image, the magnitude of the deviation affecting the magnitude of the distortion. Fang recognizes that the user can manipulate the degree of dynamic compression. However, to minimize distortion, the user must manipulate each of: the attenuation of the correction, the upward offset, and the downward offset. For instance, the larger the chosen range, then the more the distortion is minimized but also the more the subtle details are lost. A smaller range can enhance weaker signals, however, the stronger signals become badly distorted. That is to say, the process requires time and effort and experience on the part of the user to manage three parameters to try to both minimize the image distortion while maximizing the image enhancement.

Each of the above methods of image enhancement result in a loss or distortion of the original data. Loss and distortion present artifacts, which can seriously compromise a radiologist's or other diagnostician's interpretation of the image. Ideally, if intensity variations do exist between neighboring data in an image, the contrast between them should be maximally enhanced for detection by the diagnostician without the introduction of artifacts, and regardless of whether the intensity variations are in the light areas or the dark areas of the image.

An optimal approach should use control parameters which are independent in their nature. Interrelated variables require the user to make compromises, sacrificing one result in part so as to achieve part of another result. Unfortunately, such decisions require a user to gain expertise in the background to the technique before it could be properly implemented. Further, such control parameters need to be robust so that small changes in a given parameter result in manageable changes, do not cause wild results, and even poor choices should give "livable" results.

SUMMARY OF THE INVENTION

The current invention is a process of maximizing the detail between neighboring points of an image without distorting the image and without adding artificial details. Locally, all contrasts in the image are corrected in the same manner.

In the preferred embodiment, the process is applied to images where variation between neighboring points is digitally significant but the contrast is too low for the human eye to discern. Such cases include X-ray images. There is more information available in an X-ray image than one might guess. The current invention enhances this information in order to make a more revealing, processed X-ray image. The achievements of the current invention are:

- improved contrast—for aiding visual interpretation by doctors and other diagnosticians;
- good correlation of the processed image and the input image—e.g. the processed image of a chest image still resembles the original chest image;
- maximized detail—every part of the X-ray image, is maximized for maximum possible visibility, contrast being improved between subtle variations within dark regions and within light regions;
- automation of the image enhancement—thus it does not require the end user to have prior image enhancement experience; and
- avoiding distortions and artificial details—thus avoiding addition of false information to the already challenging task of image interpretation.

In a broad aspect of the invention, an image is enhanced through the local enhancement of the contrast between neighboring point intensities by fitting a first low frequency upper curve or surface to the local maximums and fitting a second independent, and low frequency lower curve or surface to the local minimums, the space or volume between forming a fairway. The raw image data resides within the fairway. A local range between the fairway local maximum intensity and fairway local minimum intensity is extracted for each point. A local scaling factor is determined as the ratio between the local range and the dynamic range for the image. Each point is then scaled by its local scaling factor so as to maximize the variation in intensity between it and its neighboring points.

Preferably the low frequency curves are determined using a two dimensional moving average, accommodating variations in point intensities both between neighboring columns and neighboring rows.

Preferably even outlier points falling outside the fairway are enhanced, not by a distorting truncation process but, through a histogram correction which rescales the enhanced image based upon a determination of intensity range of the outliers. More specifically, the locally scaled outliers have intensities outside the image's dynamic range and thus are temporarily stored or preserved at a higher precision.

Next, all of the data stored as high precision intensities, including outliers, are placed in a histogram having a predetermined or expanded range greater than the image's dynamic range and large enough to capture substantially all of the outliers. A histogram count is made and a predetermined trim rate is applied to the histograms low end and top end. Because the fairway trends both large variations and small variations in intensity between neighboring points, outliers can appear outside the fairway at almost any local position in the image. As a result, the most deviant of the outliers, selected in this manner, are usually widely dispersed and thus only minimally affect the image enhancement when trimmed. The trimmed image points have a trimmed range which defines a new range having a minimum intensity and a new maximum intensity. All the points are scaled a second time, this time at a scaling factor determined as the ratio of the trimmed range and the image's dynamic range.

Preferably the low frequency curves are determined using a two dimensional moving average and, more preferably, using filter box mean determination which markedly reduces the number of calculations required by taking the preceding filter box sums and merely subtracting the lagging point intensities and adding the leading point intensities to obtain a new filter box sum. Merely normalizing each box sum, by dividing by the sum by the number of points in the box, completes the moving average.

BRIEF DESCRIPTION OF THE DRAWINGS

FIGS. 4a and 4b are related graphs which illustrate the variation in data intensity within the sample column of data of FIG. 3. In FIG. 4a, the image's bottom to top corresponds to the graph's left to right. FIG. 4b is a copy of the corresponding sample column, again exaggerated in width for viewing;

FIGS. 5a and 5b are graphs of a simple prior art form of contrast stretching, applied to the data of FIG. 4a. FIG. 5a illustrates the data of FIG. 4a with a smoothed low frequency mean plotted thereon and FIG. 5b which illustrates rescaled output data based upon local data variations from the mean which have then been being stretched to the full dynamic range;

FIGS. 6a–6c illustrate related graphs, in which the process of the present invention was applied to the data of FIG. 4a. FIG. 6a illustrates the upper and lower bounding curves of the fairway. FIG. 6b illustrates the corresponding output data. FIG. 6c is a copy of the corresponding image column, exaggerated in width for viewing;

FIGS. 8a and 8b are isolated images which result from plotting the low frequency upper and lower bounding curves or smoothed trending functions respectively;

FIGS. 9a and 9b are graphs which illustrate and compare the raw input data and a first fairway correction scaled data stored at a precision greater than the dynamic range;

FIG. 10a illustrates a low frequency mean superimposed on the raw input data and FIG. 10b illustrates the residual points at or greater than the mean;

FIGS. 13a and 13f illustrate pseudo-code and variable definitions respectively for applying an efficient moving average technique to the image data;

FIG. 13c using a 7×7 box column by column of row summations; and FIG. 13d and 13e using a 2D box with a row by row of column summations, and then incremented one column;

FIGS. 14a–14c illustrate pseudo-code and FIG. 14d illustrate variable definitions for demonstrating one embodiment of the iterative method for applying the moving average data of FIG. 13a and determining the upper and lower bounding curves;

FIG. 15a illustrates pseudo-code for an improved convergence technique to replace the technique of FIG. 14b;

FIG. 15b is a graph which illustrates a faster convergence, iterative determination of the upper bounding curve for the data of FIG. 4a and according to the pseudo code of FIG. 15a;

FIG. 16 is a graph which illustrates the resulting upper and lower bounding curves of a fairway obtained using the faster convergence technique of FIG. 15a;

FIG. 17a illustrates the upper and lower bounding curves of the fairway according to FIG. 16, and FIG. 17b illustrates the corresponding output data after a second histogram correction step;

FIGS. 18a and 18b illustrate pseudo-code and FIG. 18c illustrates variable definitions for applying the upper and lower bounding curves determined according to FIGS. 13a, 14a–14d and application of the first fairway and second histogram corrections for outputting corrected image data such as the image of FIG. 2;

FIGS. 19, 20a, and 20b illustrate output images which result from variation of the extent of noise suppression. Specifically, FIG. 19 applies minimum bound separation (surf_mdff) of 1.5%, FIGS. 20a and 20b apply a minimum separation of the bounding curves of 3% and are identical images to FIG. 2, reproduced for comparative convenience, and FIG. 21 applies minimum bounding curve separation of 12%; and FIGS. 22–25 illustrate output images which result from a variation of the extent of filtering (imag_pcnt), as it applies to the demonstrated moving average technique. Specifically, FIG. 22 applies a filter of 5% of the image size and again is an identical image to FIG. 2, reproduced for comparative convenience, FIG. 23 applies a filter at 7%, FIG. 24 applies a filter at 10%, and FIG. 25 applies a filter at 20% of the image size.

DETAILED DESCRIPTION OF THE PREFERRED EMBODIMENT

An Image's Characteristics

Every digital device has a dynamic range which is a measure of it's ability to record relative energy fluctuations. Here, in the case of an X-ray, the intensity of fluorescence directly emitted from a phosphor plate and captured by a charge-coupled (CCD) device or the transillumination through film in a scanner. This dynamic range is usually set by the recording or scanning resolution and the digital storage means (data file). A typical digital file uses 8 bit storage which gives a dynamic range of 0–255. Also known are files using 10 bit storage which gives a dynamic range of 0–1024, 12 bit storage which gives a range of 4096, and 16 bit storage which gives a range of 0–65,535. For the purposes of this application, Applicant illustrates the process of the present invention using an 8 bit storage (0–255), the process being independent of the actual image dynamic range, and not intending that the disclosed range being limiting.

It is an objective of this invention to apply an image enhancement technique for maximizing local contrast and yet avoiding distortion associated with exceeding the image's dynamic range. The present invention recognizes that one part of maximizing local contrast is to stretch the local range to the dynamic range. Relative contrasts, from point to nearby point, are preserved at the local level—each significant sized sub-section of the processed image must make use of most of the dynamic range of the technology being used. Another part of the enhancement technique is to determine the local ranges to be stretched. Another part is to minimize or prevent distortions associated with clipping at the extremes of the dynamic range. Clipping occurs where contrast stretching scales an intensity value to a theoretical value beyond the minimum or maximum. For example, for a dynamic range of 0–255, scaled output values in the hypothetical range of 256–300 can only be recorded as 255 and thus details within such areas are lost.

Figure 1:
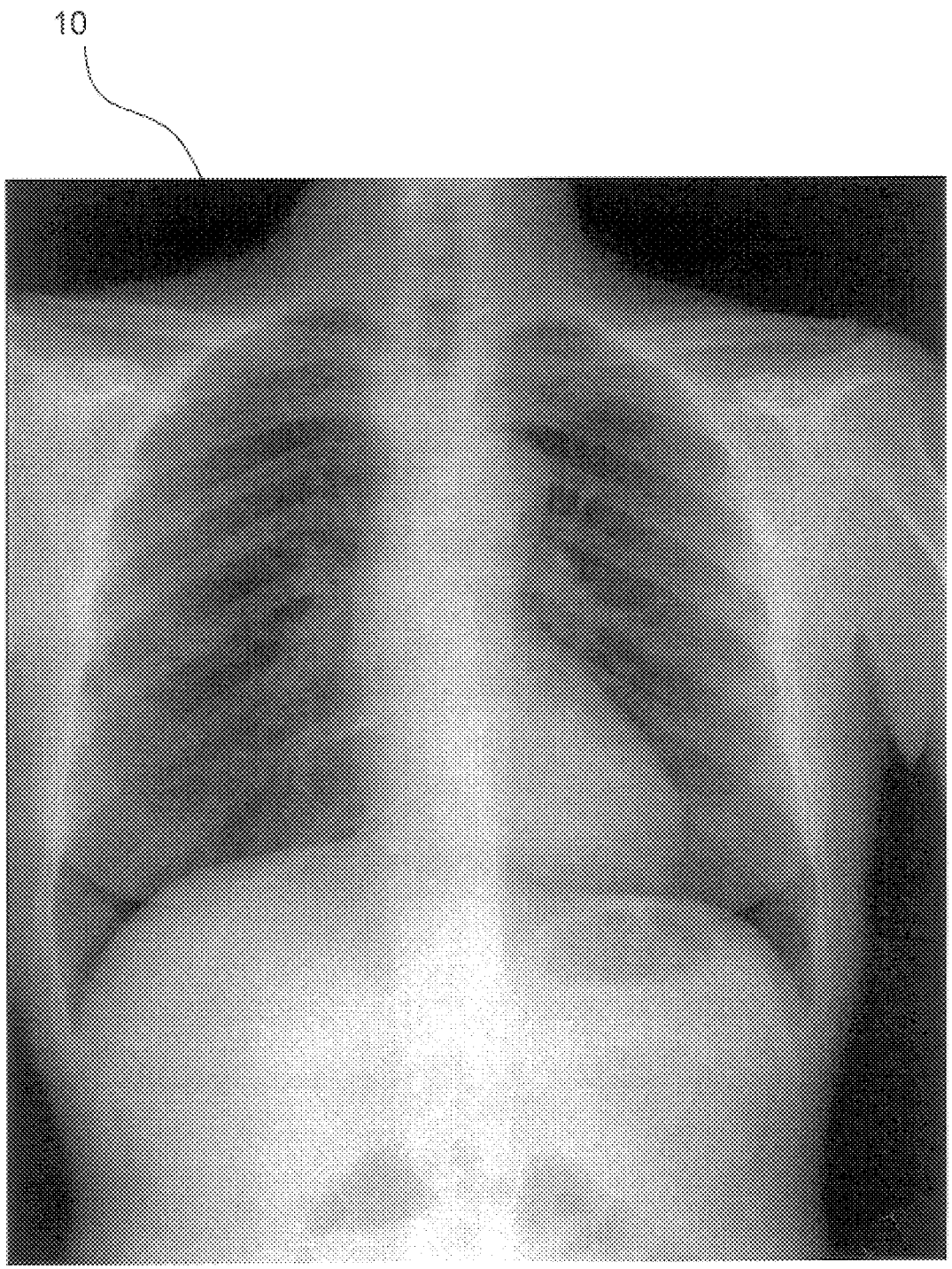
FIG. 1 is an X-ray of a chest in which many details are immediately visible, but other detail appears lost in the seemingly uniform light areas of the pelvis and vertebral column, and the uniformly dark vascular areas of the lung.

Having reference to FIG. 1, an image 10 is provided for image enhancement. The present invention was applied to generate the output image 30 of FIG. 2.

Sample Image

Image 10 comprises a data array of about 878 by 1007 pixels, each pixel having being stored with a sample dynamic resolution of 0–255 levels of intensity. The majority of this disclosure illustrates application of the present invention as it applies in a one dimensional manner to only one sample of the 878 columns of data. As is also described herein, the process actually is performed in two dimensions using nested operations for analyzing both rows and columns.

This one dimensional, mid-processing columnar example is introduced as follows.

Figure 3:
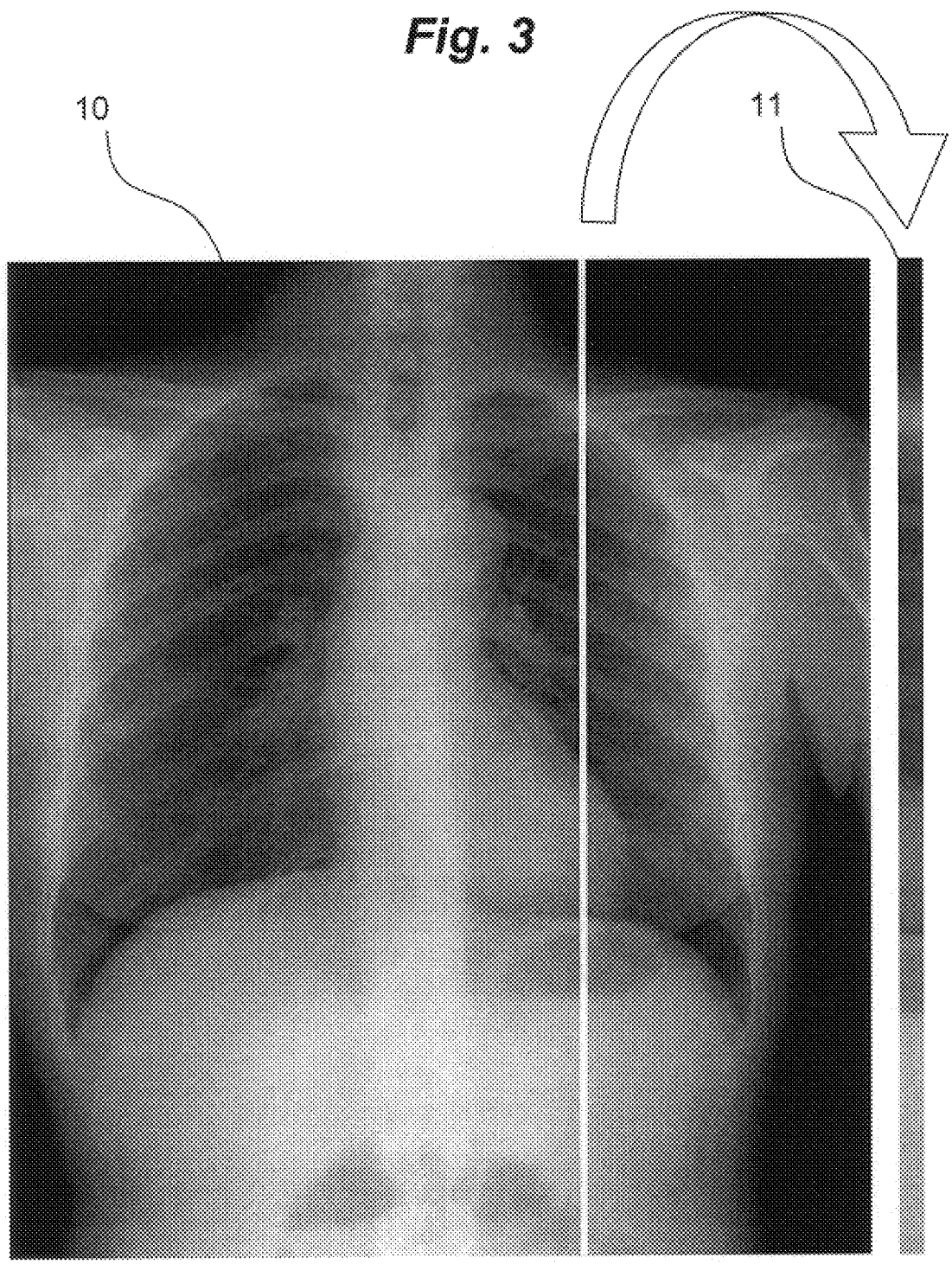
FIG. 3 illustrates a fanciful representation of the mathematical selection of one sample column of data from the image of the X-ray of FIG. 1 for processing using the method of the present invention. The sample column is shown extracted from the image of FIG. 1 and set aside, the extracted column being shown with an exaggerated width for ease of viewing.

Referring to FIG. 3, a column of data 11, selected from about ⅔ of the way across the image, from the left, is shown as physically being extracted from the image 10 (illustrative purposes only).

Turning to FIG. 4a, the raw data of the sample column 11 is plotted as high frequency curve 14. The left-hand side of the graph corresponds to the bottom of the X-ray image 10. The horizontal axis corresponds to an index of the number of dots or points counted from the bottom of the image 10 (0–1007). The vertical axis is the relative intensity of each point in terms of a fraction of the dynamic range. For this image 10, the value 1.0 means as white as possible (the top of the dynamic range limit of 255 for this particular file) and 0 is as black as possible (the lower dynamic range limit). While substantially the entire dynamic range (0 to 1) of black to white was used in this image, this particular column or subset of data only uses only about 75% of it. For example, the relative intensity of the data at the spine of image 10 is nearly 1.0.

Example of Poor Utilizations of Dynamic Range

In FIG. 4b, the sample column data 11 is illustrated shown corresponding to the orientation of the raw data curve 14.

Figure 5A:
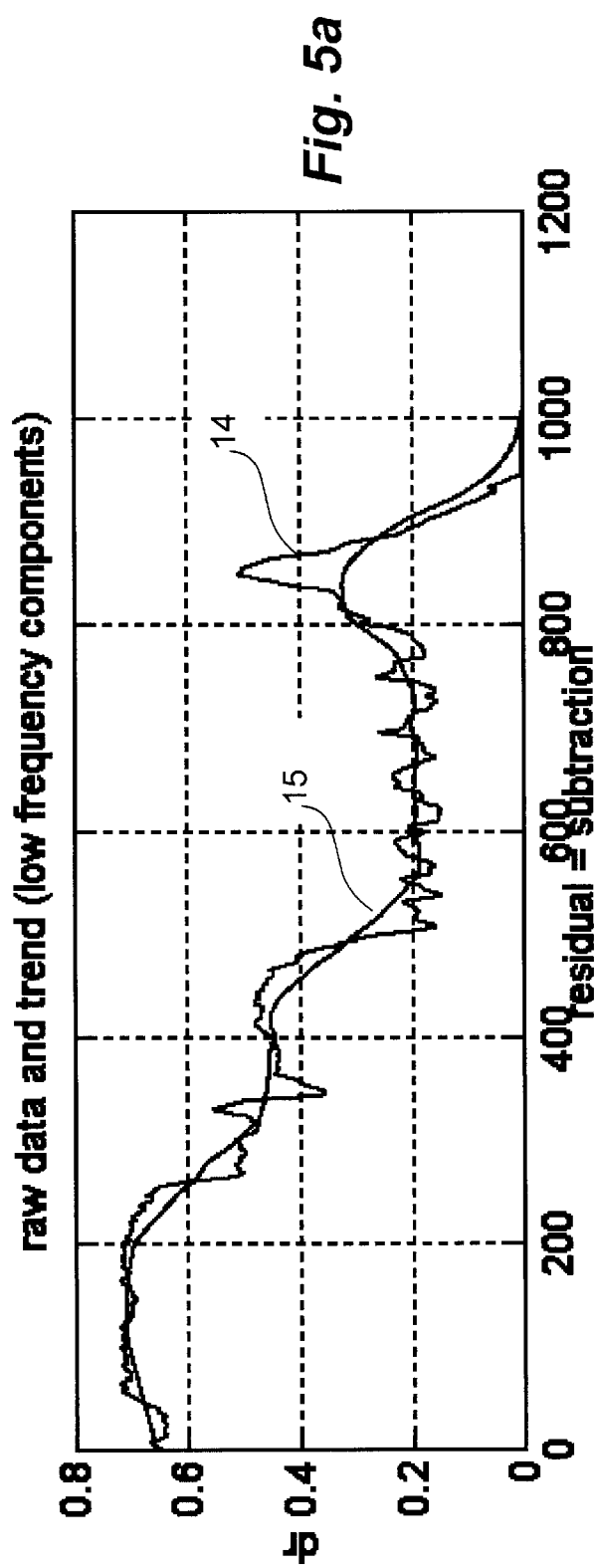
Figure 5B:
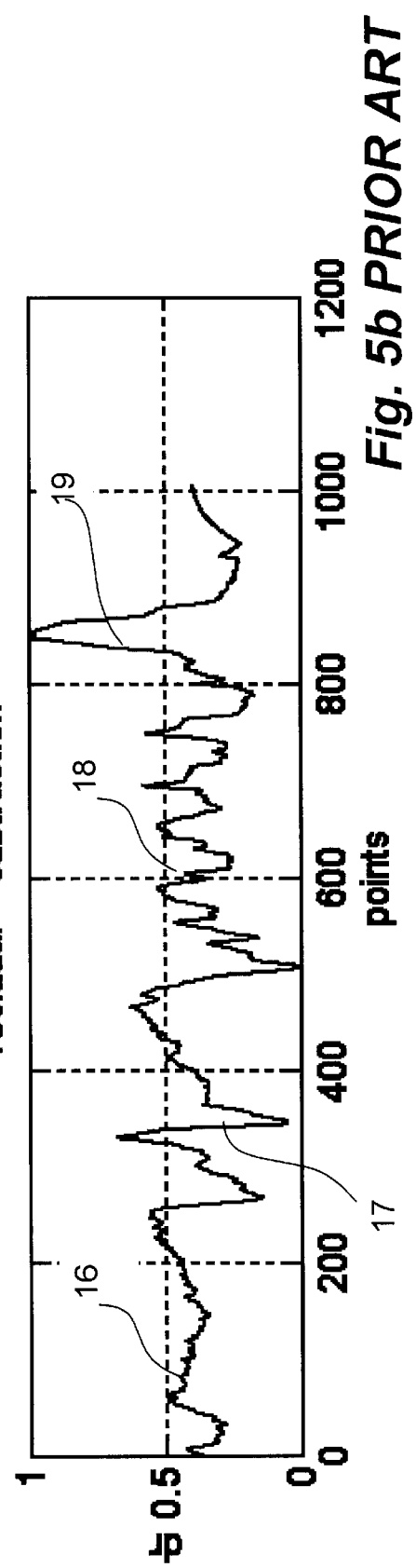

Having reference to the results of one prior art technique, in FIG. 5a and 5b, it is known in the art to preserve local contrast by removing the low frequency components from raw data 11 of FIG. 4a and stretching the resulting range to the full dynamic range. In FIG. 5a, a calculated and smoothed low frequency curve or trend 15 is superimposed on the real data 14 from which it was calculated using known techniques.

In this prior art technique shown in FIG. 5b, an output curve 16 is produced as a result of subtracting the trend 15 from the raw data 14 and then the minimum and maximum for the data are scaled to the dynamic range. This simple approach preserves the local detail, however, the residual data graph of FIG. 5b is inadequate in terms of how the dynamic range is used locally. Note that the data at 17, having a very small peak-to-trough range at points 330 to 350, data at 18 at 580 to 620 and the data at 19 that spans from 780 to 850 would ideally be corrected to a similar use of the dynamic range. Note that the range of data at 18 uses about only about one fifth of the dynamic range whereas the data at 17, uses about half, and the data at 19, uses nearly all of the dynamic range. This method treats all sets of data 14 the same and thus does not maximize the visibility of the detail within an X-ray image. Referring to prior art FIG. 5b, one can see that due to the large range intensity data at 19, causes the small intensity range for data at 18 to only be stretched to about 25% of the dynamic range.

Improved Utilization

To optimally stretch all areas of the image 10, even those originally utilizing both a small portion of the dynamic range and those utilizing a large portion, the local contrasts must be handled independently. One way to do this is to identify and choose a sub-section of neighboring data and scale it substantially independent of the remainder of the data 14.

Figure 7A:
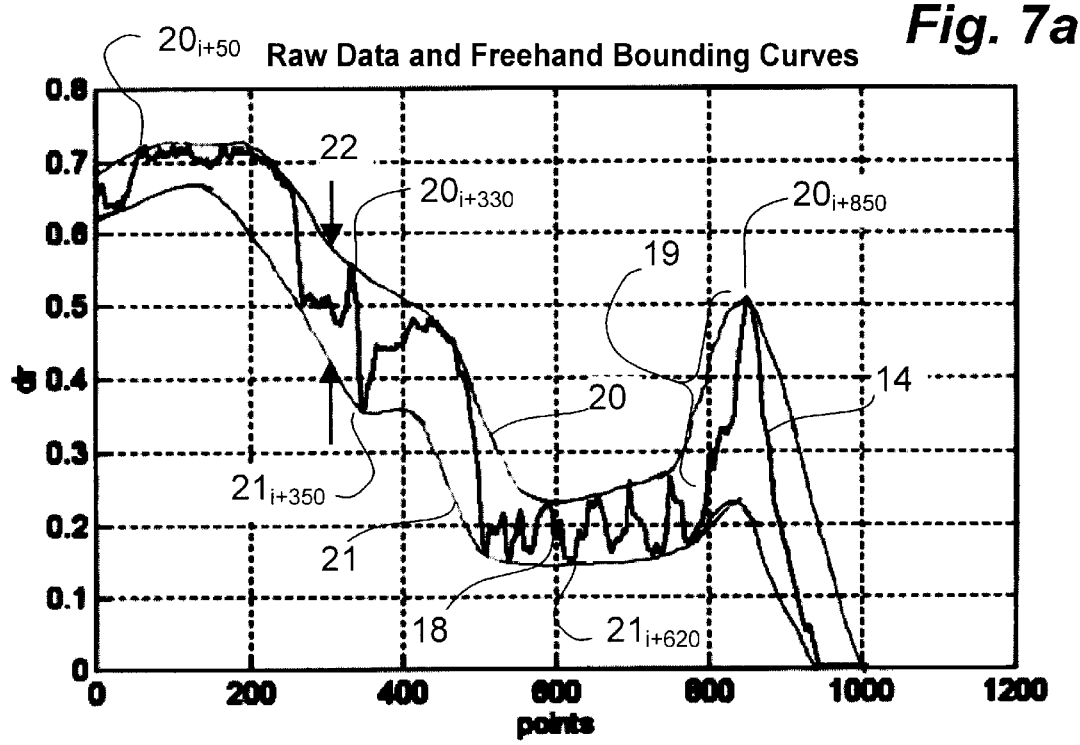
FIGS. 7a and 7b are graphs of the raw input data of FIG. 4 having scaling fairways plotted thereon; the fairway of FIG. 7a being an ideal, freehand sketch; and the fairway of FIG. 7b being calculated using a preferred moving average process of the present invention.

Having reference to FIG. 7a, three curves are illustrated, the input or raw data 14 of FIG. 4a and also, sketched freehand, an upper curve 20 and a lower curve 21. These curves 20,21 represent one concept of providing an ideal bounding of the raw data 14. These bounding curves 20,21 have a low frequency and further have the characteristic that they graze the raw data's local extreme values; the upper bound grazing local maximums ($20_i, 20_{i+1} \ldots 20_n$) and the lower bound grazing the local minimums ($21_i, 21_{i+1} \ldots 21_n$).

The low frequency aspect of the two curves 20,21 ensures that the local relative intensities or local contrast are preserved, just as in the case of the single trend curve 15 of FIG. 5a. However, unlike prior art FIG. 5b and the prior art system of U.S. Pat. No. 5,835,618 to Fang, the bounding curves 20,21 are independently responsive to the actual data 14 and not on a mean value 15.

Together, the upper and lower bounding curves 20,21 form a bounding fairway 22 which can be analogous to a defined data range which will be ultimately stretched to the dynamic range.

Now it can be seen that the intensity range data 18 at 580–620 and data 19 at 780–850 are both directly scalable to about 100% of the dynamic range, in contradistinction to the mere 25% of prior art FIG. 5b.

The challenge for the present invention is to determine where these upper and lower bounding curves 20,21 are to be placed and how, and to overcome complicating limitations imposed by computer processing systems. The remainder of this specification discloses methods for determining these bounding curves 20,21.

The Ideal Case

A mathematical correction, as introduced in Equation 1, (also a R, FIG. 18a) applies the bounding curves 20,21 to adjust each raw input data point, one at a time. An input data point is a pixel or point having a known intensity, for the selected column 11 from FIG. 3, selected from the sample images 1007 points or rows in each column 11.

$$\text{Output Data} = \frac{(\text{Image Point} - \text{Lower Bound})}{(\text{Upper Bound} - \text{Lower Bound})} \text{Dynamic Range} \qquad \text{Eqn. 1}$$

where:
- Image Point - is the value of the input data at a given point;
- Lower Bound - is the value of the minimum curve at the very same point;
- Upper Bound - is the value of the maximum curve at the very same point;
- Dynamic Range Limit - is the Dynamic Range Limit for the file or system (here 256); and
- Output Data - is the corrected data value.

The success of this first correction depends upon the method of determining the upper and lower bounding curves 20,21, determined from the raw input image data 14 and two predetermined variables or parameters.

If one can achieve the ideal freehand drawn case, no data points fall outside the bounding curves 20,21 and Eqn. 1 is a full solution, all local contrasts being preserved and scaled substantially independently of other areas of the image. Unfortunately, limitations of numerical methods and the law of diminishing returns dictates that the bounding curves will not necessary encompass all the points.

Figure 7B:
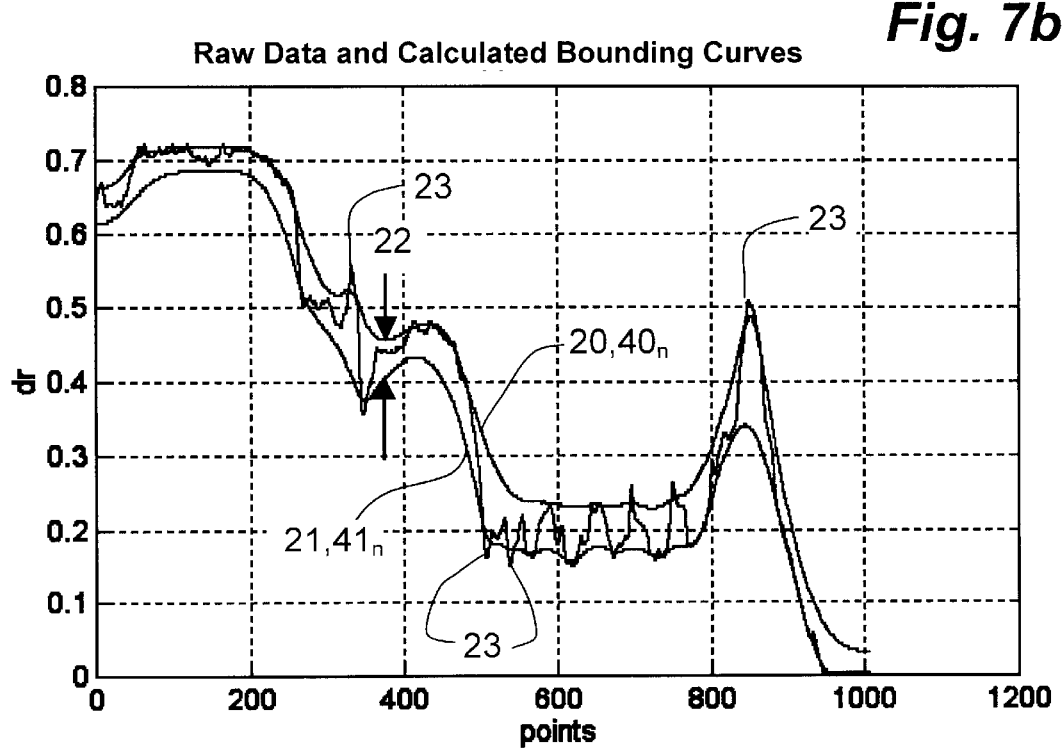

Having reference to FIG. 7b, calculated curves 20,21 have a similarity to the previous hand-eye estimated best upper and lower bounding curves. Unlike the ideal case however, there is a difference; namely that there are some outlier points 23, throughout the graph, which fall outside of the calculated fairway 22; in other words points in the raw data 14, and image 10 overall, still end up being clipped somewhat, although using the preferred additional techniques disclosed herein, the impact is rendered substantially insignificant.

For the best results, a two-step correction is implemented to handle the practicality of these calculated fairways 22. Additional techniques, including use of a histogram, are used to handle the outliers and avoid loss and distortion of the image information contained therein.

For example, after the two-step correction, the entire length of the upper curve 20, for the sample column of FIGS. 3,4a, produces a failure rate of clipped data of only about 0.2% of the population of the column's data 14. Any clipped data turns out to be the least important of the points as they are spread throughout the corrected image 30 with the result that no neighboring group of points of the original image 10 is distorted. So, even though the bounding curves 20,21 themselves may be associated with a failure rate of about 10% at the first step, the second and final correction results in the much lower failure rate of 0.2%.

The First Fairway Correction

If the outlier points 23, which fall outside of a calculated fairway 22 (e.g. see FIG. 9a at about point 330 and 350), are immediately constrained to the dynamic range, the image data integrity would suffer. Such constraints occur when using computer processing systems utilizing variables declared as having the same limited precision as that used for the input image 10. For instance, an outlier point falling above the upper bound could hypothetically be mathematically scaled to 280. Based on a dynamic range of 0–255, this outlier would be clipped to 255 and the relative intensity data would be lost. Accordingly, using digital storage means, to avoid clipping outliers at the fairway correction, a temporary data precision can be used which is higher than the dynamic range and the data is maintained therein until an additional and second correction is applied.

Eqn. 1 is applied to the raw data of image 10 and the image results are temporarily stored using a variable type having more precision than the image dynamic range limit. For example, for a dynamic range limit of 0–255 (8 bit), 1023 (10 bit), or 4095 (12 bit), as are currently common values for stored image data, a standard 2 byte (16 bit) signed integer variable would suffice. The 2 byte integer allows for a larger range, to approximately +/−32,000 and includes negative numbers as well. Accordingly, a 2 byte signed integer can holds the outliers without incurring any distortion effects.

Having reference to FIG. 9b, applying Equation 1 to the sample column data 14 of FIGS. 3,4a, and using the dynamic range limit of 0–255 as an example, the calculated temporary data 24 ranges almost from −50 to 350. The resulting data ranges would produce distortions for outlier points lower than 0 and greater than 255 except that they are being temporarily stored in the higher precision 2 byte integer variables.

A second histogram correction is applied to appropriately scale the resulting data 24 of this fairway correction, FIG. 9b, to the actual dynamic range.

The Second Histogram Correction

The temporary high precision image data of FIG. 9b is, for the most part, forced back into the dynamic range of the image. Various means can be employed.

One approach is employs a forced failure rate. Simply, a histogram of the temporary data 24 is calculated and a very small level of outlier points 23 are sacrificed for the good of the majority of the data 14. A reasonable first pass is to clip or trim about 1%; that is, the bottom 1% and the top 1% of the data is trimmed and the remaining points are scaled back to the image's dynamic range.

Accordingly, as disclosed in greater detail below and in FIG. 18a, the second correction uses a histogram to assembly the fairway correction temporary data 24 of FIG. 9b and trims the lowest and highest 1% of the data. The remaining trimmed range of point values in the higher precision temporary variables are then scaled back again to the lower precision of the dynamic range of 0 to 255. The resulting output data 34 is shown in FIG. 6b with the entire output data for all points being represented in the output image 30 of FIG. 2. The effect on the output data 34 for the sample column 11 is illustrated in FIG. 6b, wherein contrast is significantly increased, and to the same dynamic range, regardless of whether the points were originally neighboring in a substantially low intensity (dark) region of the image 10, or substantially high intensity (light) region. Compare column 31 of FIG. 6b, representing the enhanced data 34, with the original column 11 and data 14 of FIG. 4b.

Notice in FIG. 6a, that the fairway's upper and lower bounding curves 20,21 define local dynamic ranges which are all nearly equal, even though they encompass each of the medium range of intensity data 17 present at points 330 to 350, the small range of data 18 at 580 to 620 and one of the largest local ranges of data 19 at 780 to 850. In application, the trim rate is found to be far less than 1%

This process of forcibly trimming only a few of the highest and lowest values, stored in the temporary high precision data, means that only a few sparsely spaced points in the column of data points are affected at all. Accordingly, there is not much sacrificed in terms of image quality. Simply, a few isolated extremely bright (high intensity) points, which theoretically should have been even brighter still, were trimmed. However, it is false economy to save those few points, at a cost of an overall lower contrast for the entire image.

Determining the Upper and Lower Bounding Curves

For the first fairway correction, some criteria are applied to determine the extreme upper and lower bounding curves 20,21. The criteria define the rules which, in one sense, attempt to best duplicate the freehand curves of FIG. 7a. The criteria include that:

the maximum and minimum curves forming the upper and lower bounding curves 20,21 are made of low frequency components;

the frequency of each curve 20,21 is low enough (smooth enough) to preserve the local detail and yet is high enough to separate sub-areas of interest (for example, so as to preserve each of the contrast within a rib of FIG. 3, contrast within the lung between the ribs, and contrast between a rib and the lung);

the maximum and minimum curves 20,21 graze the local extreme data points $20_i–20_n$, $21_i–21_n$; and the width of the calculated fairway 22 is similar to the one of FIG. 7a, yet it is understood that some of the points 23 will end up outside of the fairway 22.

In the simplest terms, and using one numerical method or another, two bounding curves 20,21 are fit to the raw input data. One upper curve 20 having a low order or low frequency is fit, as best as possible, to the maximum intensities for the data 14. A second curve 21, also having a low order or low frequency is fit, as best as possible, to the minimum intensities for the data 14. Ignoring any outliers 23, each point which is between the two bounding curves 20,21 can be scaled to the image's dynamic range. Because it is inevitable to have outliers 23 with any numerical method used to determine the upper and lower bounding curves 20,21, the above described second histogram technique is provided to minimize their effects on the image enhancement.

One method of determining the upper and lower bounding curves 20,21, is to apply a moving average. This simply means that a trend 15 is produced which is made up of a series of points, each of which is an average of its surrounding or neighboring data. A one dimensional (1D) analysis would simply be to sum the intensity data 14 contained within a predetermined interval, and then repeat that for each point up and down the sample column 11. A 2D analysis averages all of the intensity data within an area surrounding each point as it is analyzed. For the purposes of this disclosure, the concept of an area as a rectangular box is implemented, with the average or mean being applied at its center. This box or filter box is dimensioned as a specified number of rows either side of the point (as would be the case in a solely 1D analysis), and a number of columns either side of the point.

In one embodiment it is convenient to apply a moving average to the image of FIG. 1 by selecting each of the image's individual columns 11 one-by-one. Other approaches, such as a row-by-row analysis can be employed, affecting only the order of calculation.

Upper and lower bounding curves 20,21 are determined for the selected column 11. Use of a 2D analysis ensures that, not only is continuity maintained between adjacent points in a column 11 but, also continuity between adjacent columns 11,11,11 . . . is maintained. In fact, using a 2D analysis, the example column-by-column analysis provides exactly the same effect as a row-by-row analysis.

Each column 11 is made up of a plurality of neighboring points, one point in each column-intersecting row, each of which is associated with an intensity value (within the dynamic range). A first moving average is performed so as to place a low frequency or smoothed curve 15 through the mean of the raw intensity data. This mean curve divides the raw data 14 into a residual upper population 40 of points; those having an intensity greater than the first mean curve 15. It also divides the raw data 14 into a residual lower population 41 of points; those having an intensity less than the first mean curve 15.

Then an iterative process is performed, again using a moving average technique, to calculate successive and new mean curves for each of the residual upper and residual lower population of points 40,41. As the populations 40,41 become smaller each iteration, each successive mean curve lies shifted further and further towards the maximal and minimal intensities $20_i$–$20_n$ and $21_i$–$21_n$ of the raw data 14 respectively.

It is understood that other curve fitting techniques could be used, and the example moving average technique can be further optimized. Some of these options are disclosed below.

Figure 10A:
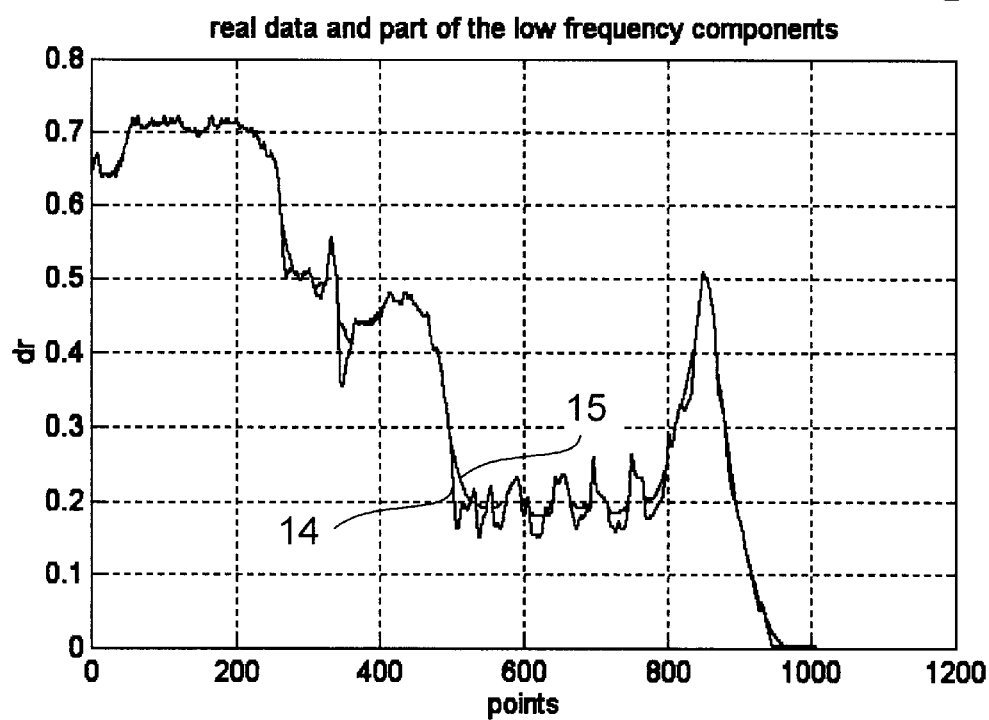
FIGS. 10a and 10b are graphs which illustrate the initial steps in determining the upper trending function.
Figure 10B:
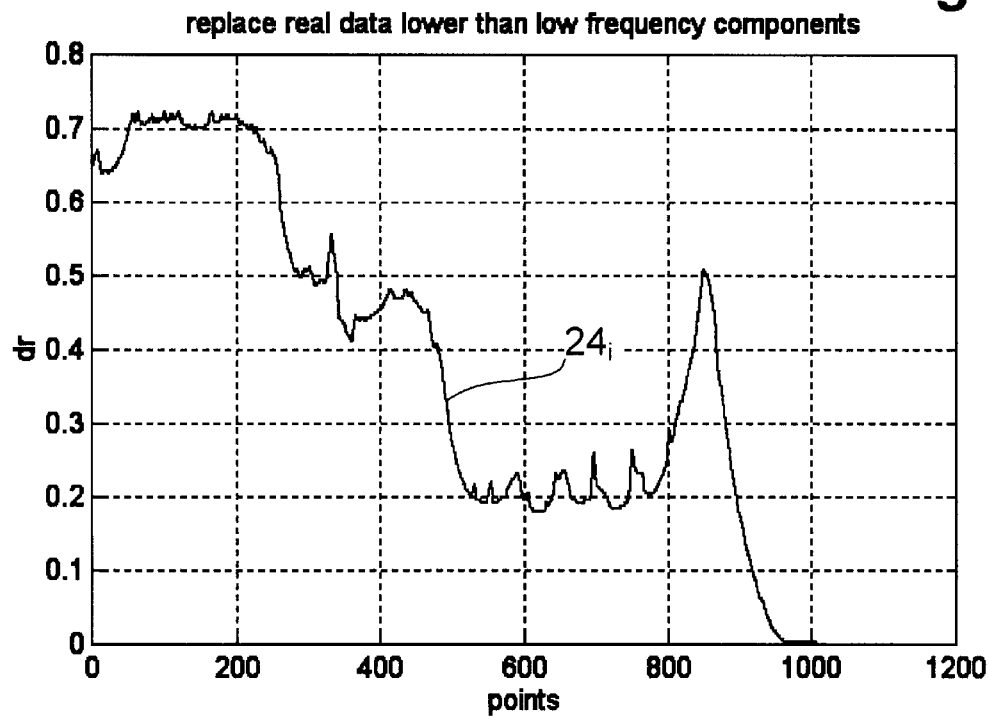

In greater detail, as applied to the determination of the upper bound only, and having reference to FIGS. 10a–12b, a moving average technique is applied to the raw data of FIG. 4a. Turning to FIG. 10a, a first mean low frequency curve 15 is calculated and superimposed on the raw data 14 of FIG. 4a. The result is a partial low frequency curve $24_i$; partial because only the residual population 40 of points greater than the low frequency curve $24_i$ have been plotted.

In this embodiment, determination of the upper bounding curve 20 and the lower bounding curve 21 are performed in the same manner, iteratively determining successive mean curves and reducing the respective data populations 40,41. The description for the upper bounding curve 20 applies equally to the lower bounding curve 21.

For determining the upper bounding curve 20, the first step is to replace input data that is lower than the calculated mean low frequency components data. Having reference to FIG. 10b, the resulting data $24_i$ is depicted, and for clarity, the lower points (used for determining the lower bounding curve 21) are shown omitted from the graph. In other words, the first step is to identify the residual upper population $40_i$ and create an artificial image that is composed, on a point by point basis, of the greater of the input data and the previously calculated low frequency component's data, in this case the first mean curve 15. The resulting population $40_i$ of artificial data has detail at the local peaks and has only low frequency components at the local valleys.

From this residual population $40_i$ of artificial data, a successive and new mean curve $24_{i+1}$ is calculated. The new low frequency components of this residual population, being composed of the greater values of the real data local peaks and the valleys of the low frequency mean curve $24_{i+1}$, on a point by point basis, are calculated and a second residual population $40_{i+1}$ is again created being composed of the maximum of the residual population and its low frequency components.

Figure 11A:
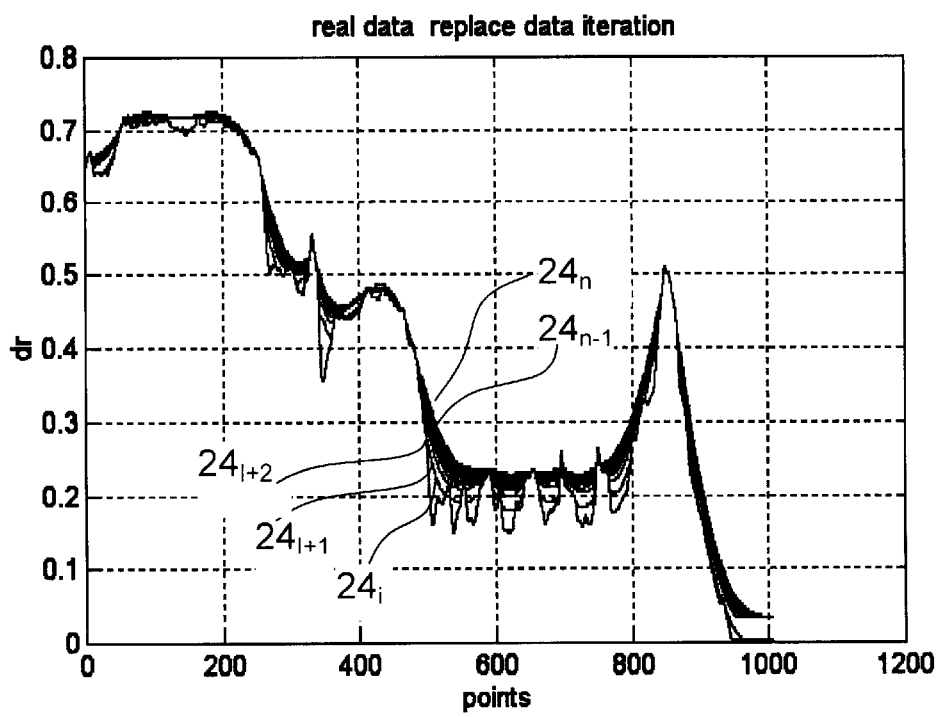
FIGS. 11a and 11b illustrate the iterative convergence determination from the data of FIG. 10b wherein a new mean is iteratively determined for the residual data remaining after applying the previous means so as to reduce the data population to a new and smaller number of residual points.

As shown in FIG. 11a, this process is repeated in an iteration loop from i to n iterations, each successive mean curve retiring to become a previous mean curve $24_i$ as each successive mean curve $24_{i-1}$ is calculated.

The same iterative approach can be used to find the lower bounding curve 21. The only difference is that the first and subsequent residual lower population $41_i$ to $40_n$ (artificial images) are calculated as the lesser of the input data and successive low frequency components of successive curves $26_i$ to $26_n$. Finding both the upper and lower bounding curves in this way produces an adequate calculated fairway 22 as shown in FIG. 7b.

Figure 7C:
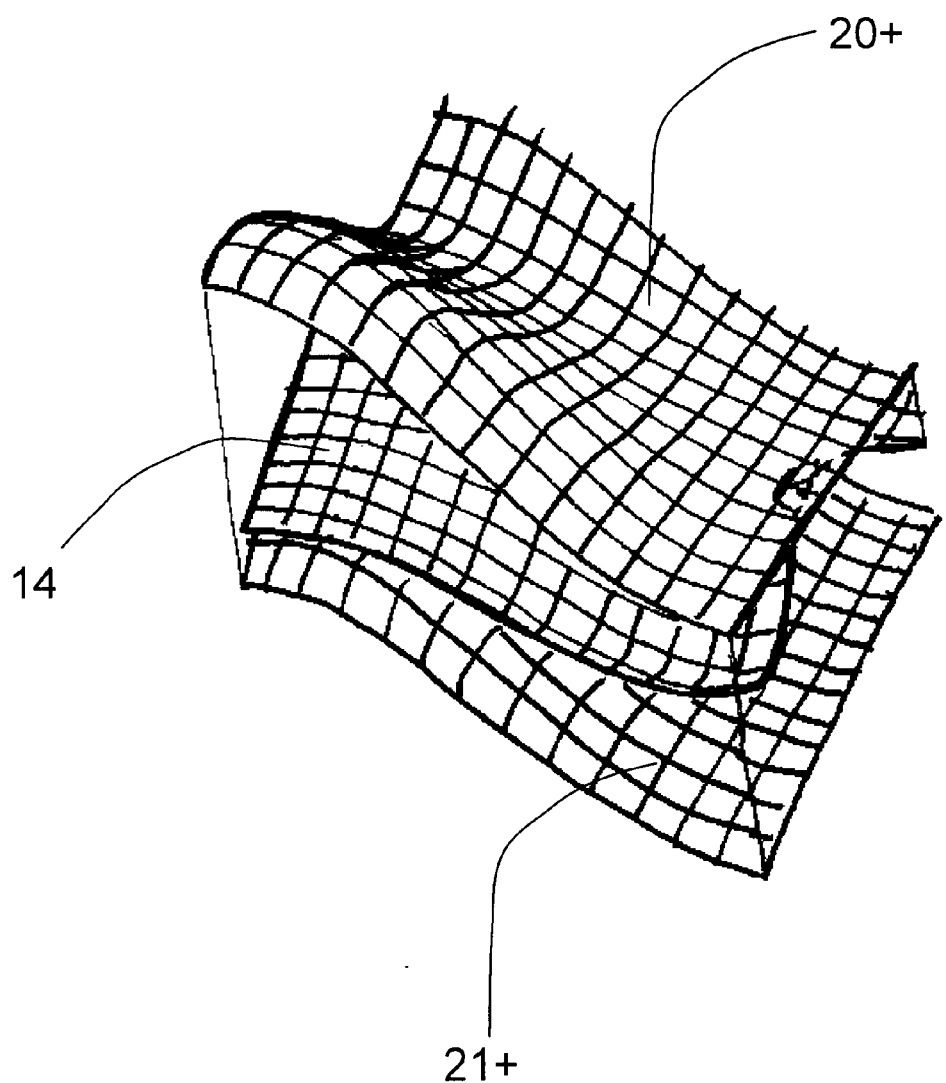
FIG. 7c is a fanciful and partial representation of 2D bounding surfaces with the raw data residing therebetween.

In one dimension, for the sample column 11 and as shown in FIG. 7b, the upper and lower bounding curves 20,21 sandwich the bulk of the raw data 14. Referring also to FIG. 7c, with respect to the 2D image, where the calculations really take place, the fairway 22 of the columnar data 14 can be extended in the second dimension (adjacent columns) for each successive analyzed set of raw data 14, and is analogous as the volume between two smooth surfaces made up of each adjacent upper bounding curve 20,20,20 . . . (20+) and each adjacent lower bounding curve 21,21,21 . . . (21+). Image examples of the upper and lower bounding surfaces a20+,21+ re FIGS. 8a and 8b, respectively.

The nomenclature, bounding curves 20,21 and surfaces 20+,21+, are used interchangeably herein and generally reflect the context of the analysis process, such as whether the image is analyzed on a line-by-line 1D curve basis or in 2D simultaneously defining surfaces for efficiency purposes.

In this 2D context, the criteria can be restated in a slightly modified form, being: the maximum and minimum bounding surfaces 20+,21+ are made of low frequency components; the maximum and minimum surfaces graze the local extreme data points ($20_i$–$20_n$ or $21_i$–$21_n$); and the fairway 22 separating the surfaces is close to the extreme ranges of the data with only a small number of outliers 23 ending up outside of the volume between the surfaces.

Figure 11B:
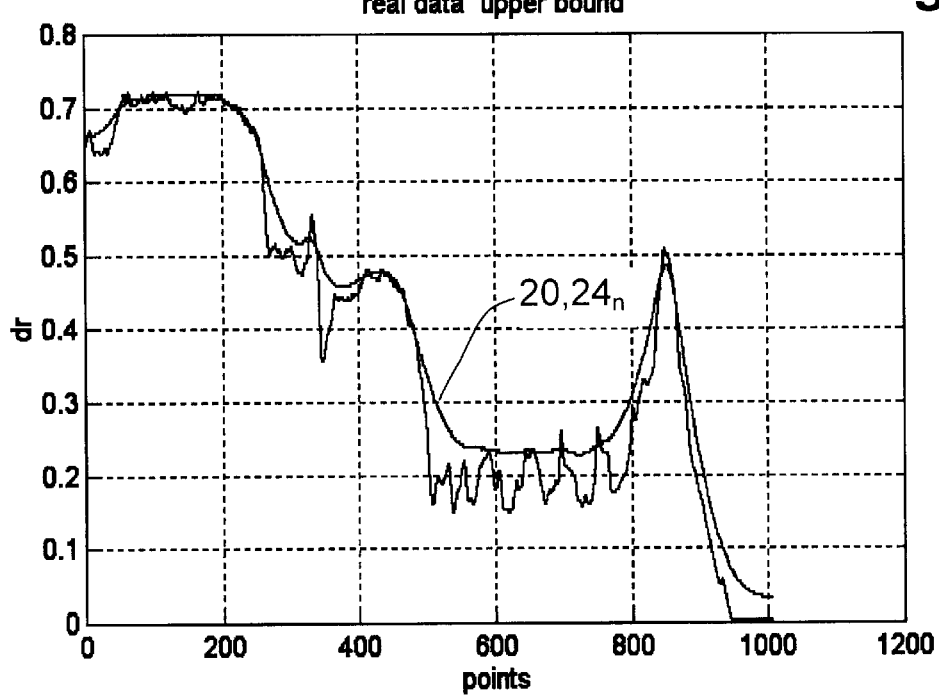

Having reference to FIG. 11b, the final iteration $40_n$ ends up with a maximum bounding curve 20 that satisfies each of the criteria above.

Determining the Order of a Low Frequency Curve

As stated, one conventional approach to determining low frequency components of a data set is to use a moving average technique or filter, simply stated to: consider a subset of the data (the image); calculate the average of this subset (average intensity); and place this value in a second image data array at the center of the subset (mean intensity).

The most straightforward two dimensional (2D) implementation is to use a filter box having an odd number of points in each of the row and column dimension, making the mean point easy to determine and index in various data arrays. For convenience, a rectangular filter box is disclosed; the average of the points within the box being calculated and the result being stored at the point located at the box's center. The center of the moving average filter box is moved over one point and a new average is then calculated for the next output point. Efficient algorithms ensure that repeated calculations are minimized and in this sense there may never be a physical manifestation of the box. This process is performed for all points in the image. Other shapes, such as circles, can be used and weighted averaging schemes can also be used as well.

The size of the box determines whether the order or frequency is low or high. For instance, for the 1007 data points of the example column of raw input data, a filter box of 503 points would hypothetically result in two mean points or a linear curve of zero frequency, blending all of the data of image 10 and obscuring any contrast variations. If the box is merely one or three points wide, the mean would be virtually identical to the raw data, resulting in a high frequency curve which would not preserve the local data at all. The choice of the size of the filter is discussed in greater detail below.

A moving average filter analysis has several practical weaknesses, including: one being that there is no data past the edges and thus artificial techniques are required to calculate the low frequency components near the edges; and another being that there is a high computational inefficiency, due to many redundant additions.

Figure 12:
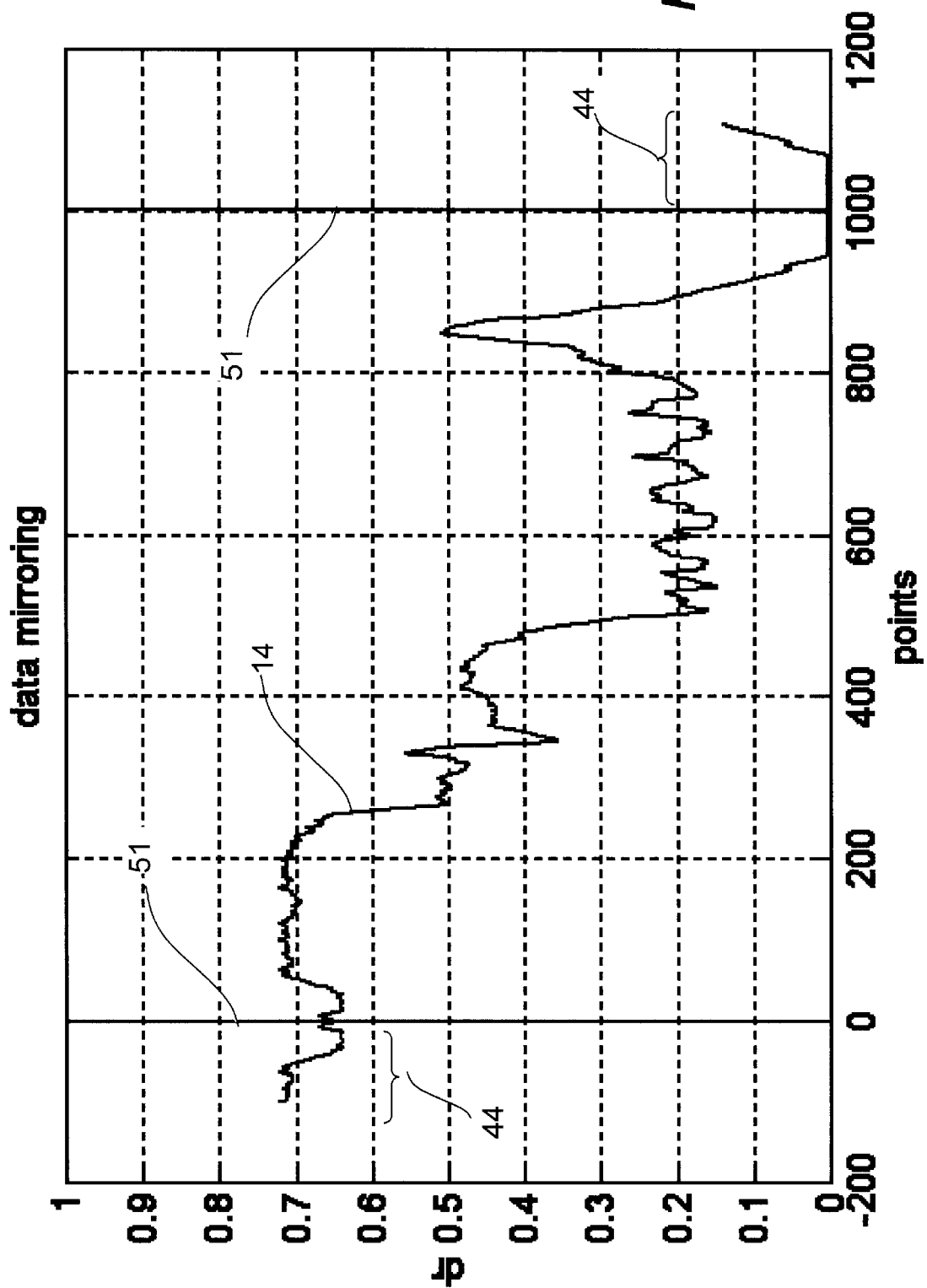
FIG. 12 is a graph illustrating data mirroring at the image edges.

Having reference to FIGS. 12 and 14c, the way that image edges are dealt with in the current invention is to mirror the data at the end points or image borders. A temporary data array (imag) is provided which is larger than the dimensions of the image data. The image data is stored in the array with sufficient room available at the beginning and at the end of the image data for the mirrored data. The amount of points mirrored is dependent upon the size of the moving average filter box. At least as many points as ½ of the filter box size (dimensions of col_pad and row_pad) must be mirrored to place the filter box at the image edge and still calculate a mean and store it at the image's edge.

More particularly, and having reference to FIG. 12, the original input data is the same as previous graphs except that there is a larger range of point numbers; for the 878×1007 point image of FIG. 1, going into the negative numbers lower than point 1 and beyond the image edge of 1007. The mirrored data 44 is shown prior to point 1 and after point 1007 as denoted by solid vertical lines 51. The extra artificial data is exactly a point-by-point mirror image of the real data 14, which ranges from points 1 to 1007 on this graph.

This mirroring is one practical way to handle the image's edges because the resulting artificial mirrored data 44 has similar characteristics to the real data 14 including: the point to point contrasts between real data-and-artificial data or artificial data-and-artificial data are the same as that found within the actual input raw data; and basic statistical qualities of the input data and the artificial data are similar.

Moving Average Filter

Figure 13B:
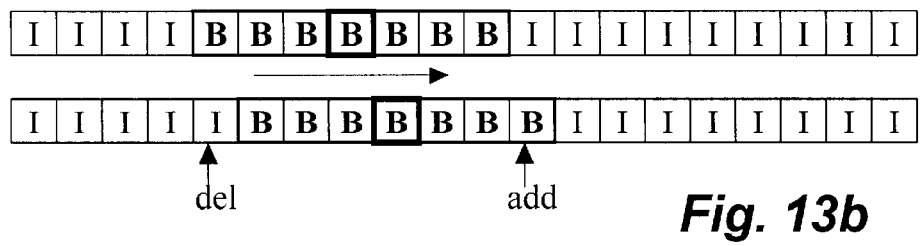
FIGS. 13b–13e are fanciful illustrations of the moving average technique for improving the efficiency of the summations, FIG. 13b for one 7-point row of column summations incremented one column.

As set forth in the sample Visual Basic (Microsoft Corporation) code of FIGS. 13a and 13b, the normally inefficient moving average can be made more efficient through the repeated use of values calculated once and applied many times. This determination is also referred to in the pseudo code of FIG. 14a as subroutine effc_2dma when used to calculate the upper and lower bounding curves 20,21. Mirrored data 44 is generated all around the edges of the image 10, by a sufficient number of rows and columns to satisfy at least ½ of the anticipated dimensions of the filter box.

Once the image has its edges mirrored, then moving average technique can be applied to find the low frequency bounding curves 20,21. Applied mechanically, a moving average technique is computationally inefficient as there are many repeated calculations (additions). This is of particular concern as the moving average technique is to be used in an iterative process.

Turning to the pseudo code of FIG. 13a, at A, the overall image dimensions are initialized as rmin and rmax, including the mirrored data of dimension rows-pad. At B the filter box column dimensions are initialized as c2bg and c3en. A rectangular moving average filter box with uniform weighting (of 1.0) is applied.

Note that in the least efficient application of the moving filter, the intensity values for a subset of a line (1D) or a box of points (2D), the filter box, is summed. In such an analysis, the surrounding filter box of points is incremented one point, each point is summed and a mean is calculated. The number of operations is each to the number of point addition and a division to get the mean.

Efficiency is improved by acknowledging that the bulk of the filter box averaging calculations are repeated.

Having reference to FIG. 13b, in a known and basic concept, in 1D, is that for a row of image points I I I I I . . . , a filter box having a demonstrated dimension of 1 row by seven column points BBBBBBB are summed (7 additions) and are divided by 7 to determine the mean, as indicated in a highlighted square at the center of the BBBBBBB. When the filter is incremented one column, the value of the point in the leftmost column is subtracted from the sum and the value of the point in the rightmost column is added, all of which is again divided by 7. The result is only 2 arithmetic operations and one division. For larger filter boxes, this results in large computational savings.

Applicant has improved this known approach to apply in work in 2D and can apply it to an entire image 10 while avoiding repeat calculations in these very large arrays of points.

Figure 13C:
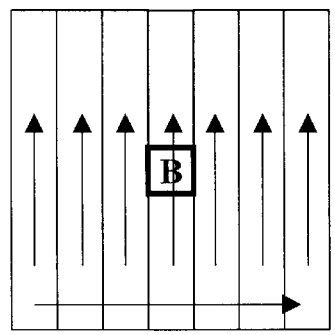

It can be demonstrated that identical analyses result from either a row and column approach or a column and row approach. In FIG. 13c, a plurality of filter subset points in adjacent rows (seven high, three below center and three above) are summed and then the resulting row sums are summed across a plurality of filter columns (7 wide). Resulting in the same calculated mean, in FIG. 13d a plurality of filter subset points in adjacent columns (seven wide, three left of center and three right) are summed and then the resulting column sums are summed across a plurality of filter rows (7 high).

Figure 13D:
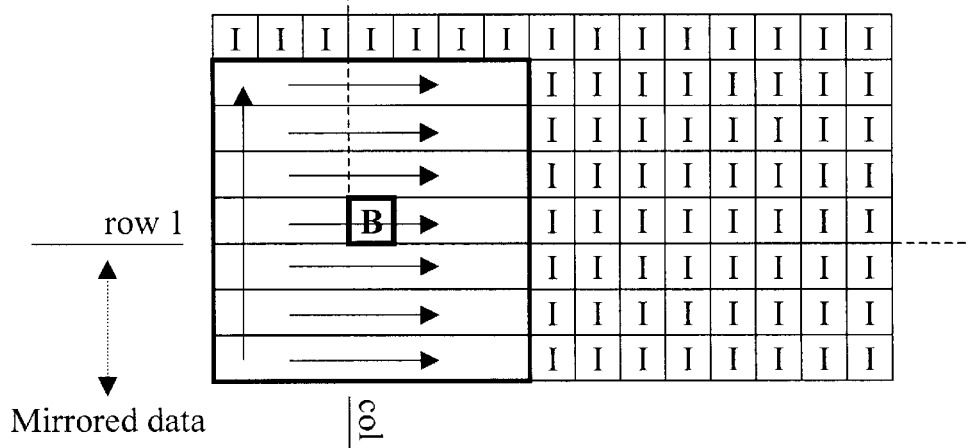
Figure 13E:
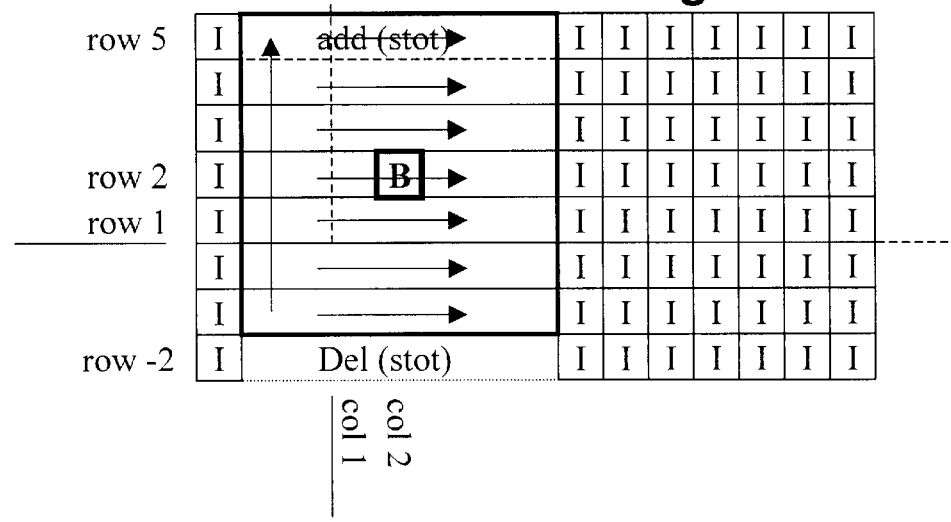

FIG. 13e illustrates a 2D application of a row-by-row traverse of the efficient calculation approach as described in FIG. 13b for one dimension.

The approach illustrated in FIGS. 13d, 13e are only visually illustrative of a moving average technique applied in 2D. Actually, as can be seen in the code in FIG. 13a at C and D, the analysis is actually staged into two iterative steps and a normalization step.

In a first iterative step, at C, one dimensional filter box column sums are calculated for the plurality of points within the filter box dimension, and are stored in the array (stot). For the entire image, each successive filter box column sum is calculated using the efficient 1D approach. The array (stot) is indexed by the center point for the filter box column sum.

In the second iterative step, at D, for the entire image, a point by point moving average analysis is performed, effectively determining every moving average curve in the image simultaneously. For each and every point, as shown in FIG. 13e for a snap shot of one point, the filter box column sums (stot) below the point, at, and above the point are summed—pulling the column sums from the stot array. The division by the number of filter box points or normalization step is not yet done. For each successive point, the same efficient concept is applied by subtracting each previous filter box column sum stot and adding each successive sum as the calculation loop traverses, and whether on a column-by-column or row-by-row basis.

Finally, every point in the image is normalized by the number of points (npts) in the filter box.

Referring more particularly to the code in FIG. 13a, at C, in a first nested loop, for irow and ico2, image data for neighboring columns is summed (the filter box column sums or partial sums) for the filter box of the first sample column 11. The first nested loop (ico2) calculates the partial sums for points in columns either side of the sample column direction (the width of the filter box), and at a particular row position for the first column of the input data. The second nested loop (irow) then increments the partial sum routine, row-by-row and up the column between the image limits.

Next in C, the second of the nested loops, for ico1 and irow, calculates the partial sums for each successive column. Here efficiencies are improved as described above; as one moves from the first column to the last column, and re-calculates the partial sums, the new sum is merely the last sum, less a trailing point and plus a leading point. More specifically, in the innermost loop of this second nested loop, as the central point only moves one position, the partial sums for the next incremental filter box are the same as dropping the previous first element (ico5) and adding the current last element (ico4). In this way each partial sum is only done the one time, and not each time the box is moved. The total number of operations for the partial sums are very nearly equal to one addition and one subtraction for each point in the image.

At D the filter box sums are performed. Note that a calculation consuming separate step is not required to obtain subtotals for the filter box row dimensions as they were done at C and indexed in an array (stot). The first nested loop at D calculates the filter box by combining the partial sums from C and the sums for neighboring points in the filter box for rows straddling the first row.

The second nested loop at D then successively calculates the full filter box sums for the rest of the columns and for the rest of the rows. Again, this second step is again done as efficiently as possible. As the central point of the filter box only moves one position, the new sum is the same as dropping the previous first partial sum (iro5) and adding the last current partial sum (iro4).

Accordingly, now between C and D, the total number of operations for the full 2D sums is very nearly equal to only two additions and two subtraction for each point in the image 10.

Finally, at E, as we want to know the average of the summed data and not just the sum itself, we must divide the sum of the intensity by the number of points summed (npts) which is the area of the box.

Using the above technique, one does not need to physically maintain an intermediate filter box array of intensities, nor the calculations or operations to produce them. The total operations required for the moving average is nearly equal to only 4 additions/subtractions and 1 division per point in the image—regardless of how many points are averaged. Accordingly, in the case of a moving average rectangular box of 81 by 101 points (about 10% of the image dimensions), which is not unreasonable for this sort of application, the normal inefficient moving average technique would have required 8,181 additions and 1 division per point in the image—again versus the respective 4 and 1 now possible.

The problem of the computational inefficiency of the 2D moving average filter is thus solved—by the introduction of an extra holding image data array (stot) for the subtotals.

This technique is repeated for each and every other column in the image.

Iterative Technique

As set forth in the sample code of FIGS. 14a–14c and definitions set forth in FIG. 14d, the moving average filter box dimensions are set and the moving average mean curves $24_i$–$24_n$ and $26_i$–$26_n$ are calculated and are iterated upwardly and downwardly to form the extreme upper and lower bounding curves 20,21, extreme curves or extreme surfaces 20+,21+.

The filter box dimensions can use predetermined default values. As is shown later, enhancement of the image 10 is rather insensitive to even large variations of the box size. For a certain type of image, a default value produces acceptable results.

Having reference to FIG. 14a at F, one convenient way to reference the filter box size is to set it as a fraction of the dimensions of the image 10. Box parameters rows_pad and cols_pad are calculated from the number of image rows and columns; simply as a percentage of the dimension divided by two so as to provide the ½ box dimension, either side of the box's center. Note that this is also how many data points 44 at the end points that need to be mirrored.

At G, array limits are defined to hold various temporary versions of the image data. For convenience, the variables cmin, cmax, rmin and rmax were chosen so that the index values referring to the same data point in the original sized image 10 or mirrored sized data arrays are the same. It is understood that the storage, reading and writing of the original image and how columnar, rows and intensity data are extracted from data files or image arrays, is system and programming language specific, the means of which is known to those skilled in the art and is not detailed herein.

As defined in FIG. 14a, image_wrk1 contains the raw data, image_wrk2 contains the current upper bound data, image_wrk3 contains the current lower bound data, and image_wrk4 holds the filter box sums for efficient processing. These arrays are initialized to the mirrored dimensions.

At H, image_wrk2 is initialized to hold mirrored raw data and then routines data_mirr and effc_2dma calculate the moving average of the mirrored data and place it in image_wrk2, which is then copied to image_wrk3. In other words, at this first stage, the current approximations of the upper and lower extreme surfaces 20+,21+ are, at this early point, are identical and simply equal to the moving average mean curve 15. The subroutines are only called once for the sake of efficiency.

At I, a tolerable failure rate, frat, for outliers 23 is set to an arbitrary value of 5% (for either above or below). The nature of the histogram correction is such that as long as the failure rate, during the iteration, is not huge, no problems are experienced. There are also upper surface minimum and lower surface maximum parameters, surf_mdff, which handle noise. This parameter is described in more detail below.

At J the iteration is initiated.

At J1, the first step of the iteration, the upper surface iteration array imag_wrk2 is loaded up with the greater of the residual population of data 40 and the last iteration $50_i$ of the upper surface 20+. The lower surface iteration array imag_wrk3 is loaded up with the lesser of the residual population 41 of data and the previous iteration $51_i$ of the lower surface 21. It is this first step that forces the data in the two arrays to be the upper and lower surfaces 20+,21+.

At J2, the second step of the iteration, the data in the two arrays are mirrored.

At J3, the third step of the iteration, the low frequency components 50,51 of both residual upper and lower populations 40,41 of artificial data sets are found. The two latest approximations of the extreme upper and lower curves 20 are output from the subroutine effc__2dma and are stored in the arrays imag__wrk2 and imag__wrk3.

At J4, the fourth step, the minimum and maximum surfaces 20+,21+ are required to have at least a specified minimum separation surf__mdff. Whenever the surfaces are separated by less than the minimum, one point by point basis, the surfaces are then readjusted so that they are separated by the minimum; otherwise insignificant variations, possibly even noise, end up being scaled to the full dynamic range. This separation is done symmetrically, half to each surface. The four conditional "If" statements at the end of the nested loop readjust the surfaces in the unlikely, but possible, event the previous adjustment pushes one outside of the dynamic range. After this step, the two surfaces will be separated by at least the minimum value everywhere.

This fourth separation step J4 also aids in convergence of the iteration as it is less likely that data local to this correction will be found outside the adjusted volume between the surfaces 20+,21+.

At J5, the fifth step, the number of outliers 23 outside of the volume between the two surfaces 20+,21+ establishes a failure rate. Thus, the process is aware of the degree that the current attempt at the extreme surfaces has failed to contain the data.

At J6, the sixth and final step of the iteration, a determination is made whether the iteration should continue or if the current upper and lower bounding curves $50_n, 51_n$ are sufficient. Simply, the iteration will end if the iteration flag (itrf) is set to no, otherwise the loop repeats the do loop of J1. The itrf flag will only be set to no, signaling convergence if one of two conditions are met: if the failure rate on both the positive and negative sides is less then the acceptable failure rate; or if the number of iterations is too high. In this case, an arbitrary number of 10 is used. It is important to point out, again, that the failure rate here is not that important due to the secondary correction. Still, a balance is found between the quality of the curve fit and the amount of effort expended without iterating forever.

Once the loop is complete, the extreme upper and lower bounding surfaces $50_n, 20+$ and $51_n, 21+$ are known and can be output themselves as image files (as illustrated in FIGS. 8a,8b), or as other computer files, for quality control purposes. Process for outputting such images for display or storage is not disclosed herein as it is known by those anyone skilled in the art and is dependent upon such variables as the particular image format and display hardware used. Now that the upper and lower bounding curves are established the first fairway and second histogram corrections can be performed to enhance the image of FIG. 1 and produce the image of FIG. 2.

Improved Convergence

As can be seen from multiple curves of FIG. 11a, the iterative solution converges somewhat slowly. There is a computational incentive to get a faster convergence—more movement per one iteration pass.

Figure 15B:
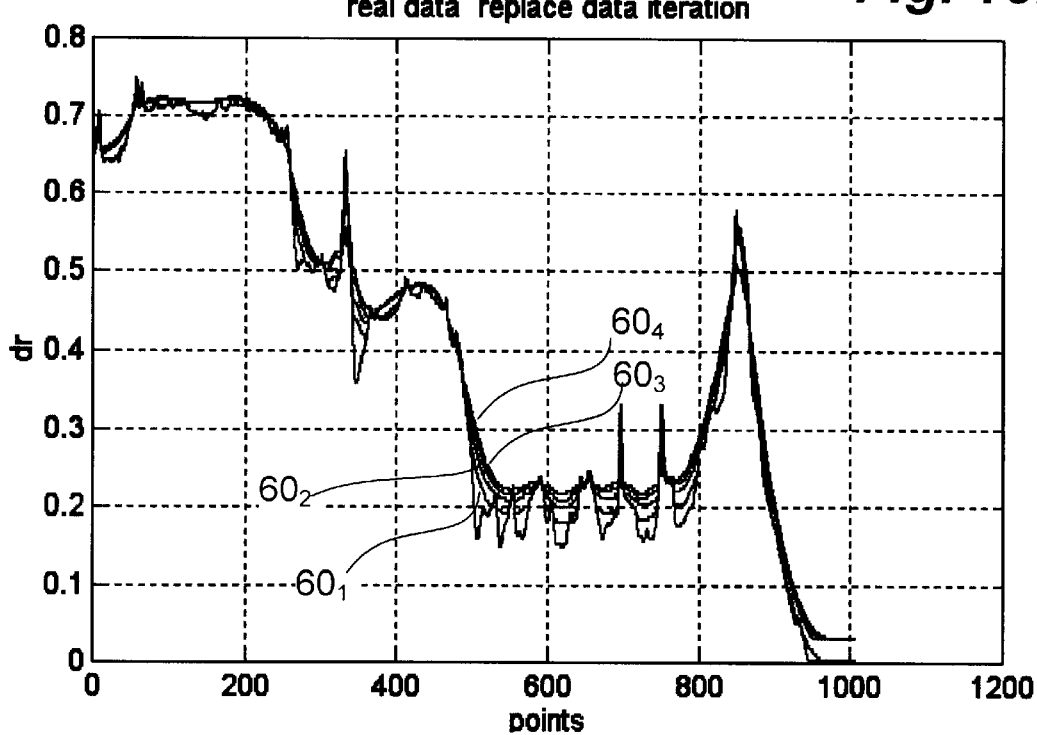

In a modified approach, detailed in FIG. 15a, the data analyzed for the next iterative mean curve 60 is not simply the residual data populations 40,41, as in FIG. 11b, but instead comprises an exaggeration of the data. The difference between the extreme points of residual data 40,41 and the curve 50,51 of the current iteration is multiplied by the number of iteration passes. This makes for a quicker convergence as each pass gives more and more correction to the repeated failure points. There are checks to ensure that no extra correction is beyond 20% of the dynamic range and that no value is replaced with a value outside of the dynamic range.

Figure 16:
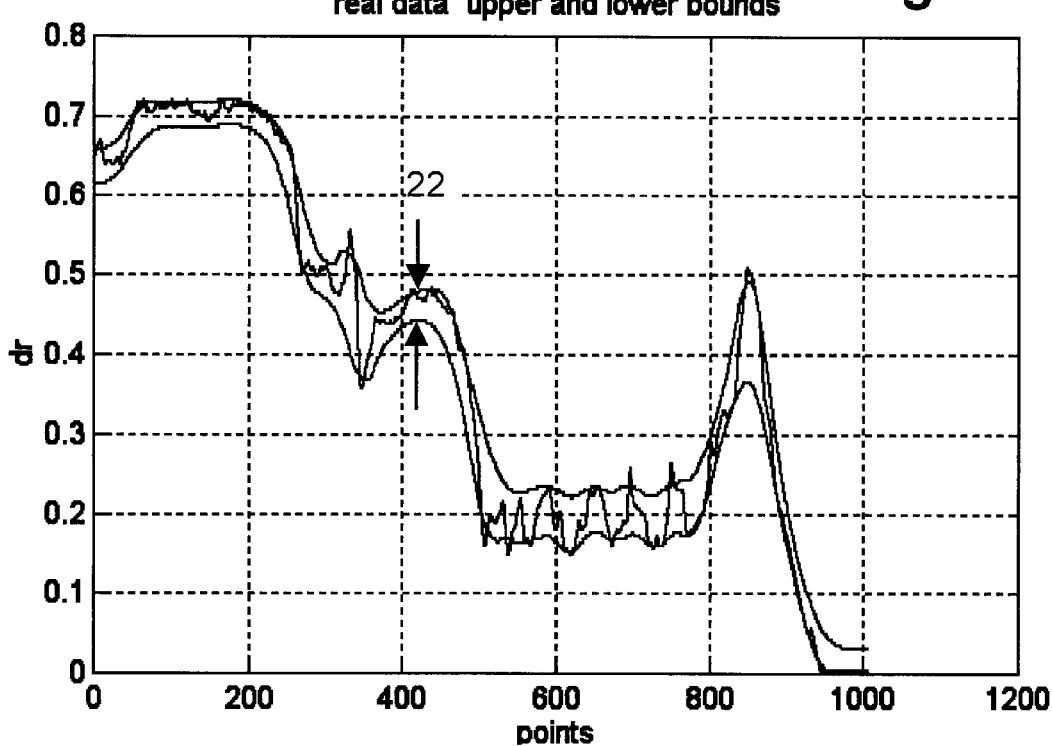
Figure 17A:
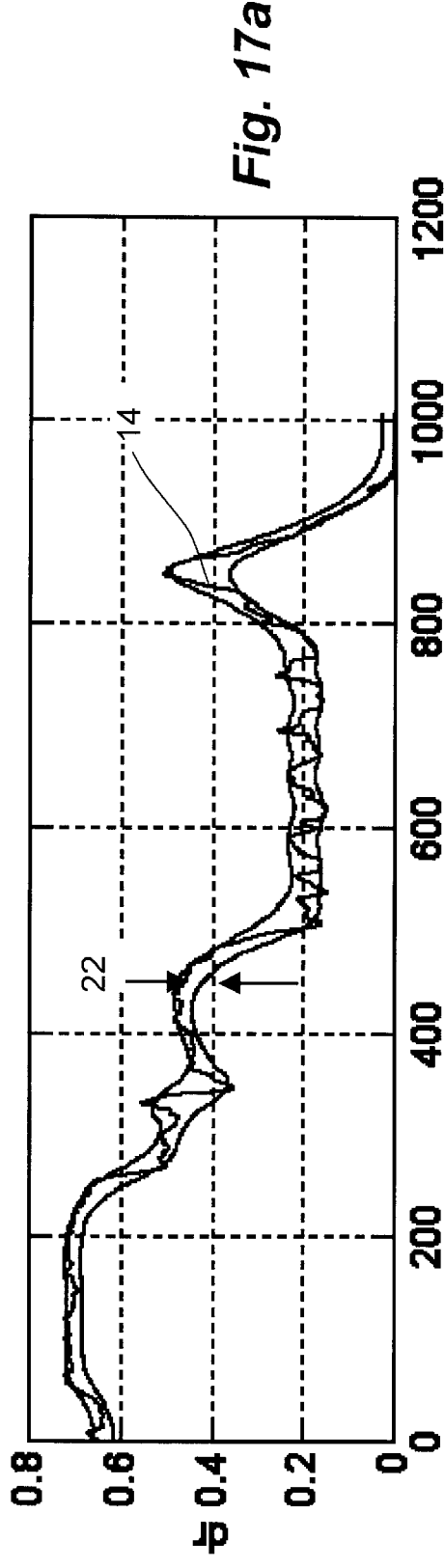
FIGS. 17a and 17b illustrate related graphs, more particularly.
Figure 17B:
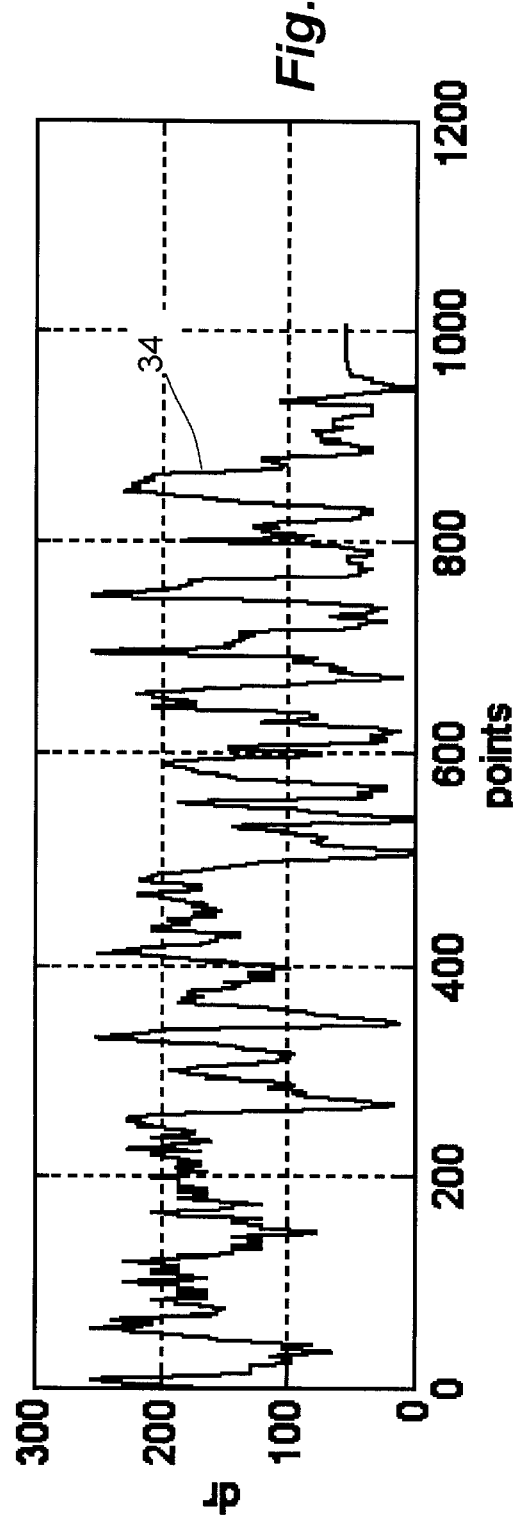

Having reference to FIGS. 15a–17, when applied to the raw data of FIG. 4a, this modified approach took only 4 iterations $60_1–60_4$ to converge (FIG. 15b) in contrast to the previous 10 iterations $24_1–24_n$ which, regardless of its higher number of iterations (ten), still resulted a failure rate greater than 5%. The fairway 22 resulting from the enhanced convergence technique, as shown in FIG. 16, is not quite as smooth as in the previous 10 iteration case, as is the natural consequence of fewer iterations, but it is acceptable. As shown in FIG. 17, the subsequent second histogram correction result 34 is very similar to before, as compared to FIGS. 6a and 6b. It is not visually apparent which convergence gives the better result but it is clear that both give a very comparable effect where most of the dynamic range is used locally.

In an alternate, non-iterative statistical technique for finding the extreme surfaces, a moving average of the raw input data, is once again calculated initially. Then, the difference of the raw data 14 and the moving average mean curve 15 is calculated. Finally, the standard deviation of the residual data of FIG. 5b, is calculated using the same size filter box of original data as the moving average. Using the same essential logic as the efficient 2D moving average filter of FIG. 13a, but modified to suit a moving standard deviation, a local measure of the standard deviation of every point could efficiently be determined. The extreme surfaces would then be calculated as the moving average +/–(a constant * moving standard deviation) for each point. This constant is set to a number that would typically yield something like a 1% failure rate. Empirically, a suitable constant appears to have a value near 2.0. Note that in the true Gaussian data, or perfect bell curve, that about 98% of the data falls within 3 standard deviations of the mean.

The Second Histogram Correction

Having reference to the coding in FIG. 18a and the definitions in FIG. 18b, separation of the data correction into 2 steps, as discussed above, allows for flexibility in the estimating of the extreme surfaces. Approximate curves 20,21 for the surfaces 20+,21+ are acceptable. Even a high percentage of the data 23 outside of the extreme surfaces at the first step does not result in serious data clipping.

This is an important distinction from the prior art techniques which apply conditional statements so as to handle the image data differently if they are above a threshold or below; in a sense creating two separate data populations and two different corrections.

In the present invention, while the first fairway correction and makes a preliminary assessment of scaling ranges which identifies and ensure that even outliers 23 are not lost but continue to be preserved and maintained in the main data population 14 throughout the use of the histogram and its expanded scaling range. Finally once as many data points have been enveloped as is possible, only the most deviant of the outliers are finally trimmed.

At R, the fairway correction is illustrated in pseudo-code form, wherein the raw data imag__wrk1 less the lower curve imag__wrk3 is scaled by the fairway's range (imag__wrk2-imag__wrk3) to the dynamic range (drlm), the corrected data being stored in imag__wrk4.

The second histogram correction allows for control on exactly how much of the data is to be clipped or trimmed.

Also, as the data from the first fairway correction is already residual in its nature, only a small amount of data to be trimmed will also be sparsely distributed throughout the image resulting in no noticeable distortion in the image at all. The fairway correction by the application of Equation 1 (at R) retains the outlier information by temporarily storing them in a higher precision variable than is needed for the dynamic range. This fairway correction also allows for negative numbers.

Data below the lower extreme curve 21 is calculated as negative and values above the upper extreme curve 20 are calculated as numbers above the dynamic range of the input image file/data. The histogram correction is, then, performed on data that has very similar statistical qualities of what will be the output data, seen by comparing FIGS. 9b and 6b. A histogram of the first fairway corrected data is made using a broader range of events than is likely to occur. Empirically, it has been found that the range of values calculated by the fairway correction are unlikely to exceed three times the dynamic range and these limits are arbitrarily used to set the histogram dimensions.

The histogram count is then made by looping through the first fairway corrected data and counting the number of occurrences of each intensity value.

Referring to FIG. 18a again, at S, the histogram is counted normally where in the fairway correction data lies within the expected range of −drlm to drl2 (three times the output dynamic range). While it is unlikely that any fairway correction data values would be outside this range, these possibilities are dealt with nonetheless. Merely extending the range beyond 3*drlm is no guarantee.

Accordingly, at T, in the unlikely event that a data point lies outside of the expected range, the histogram count is incremented at the extremes of the histogram. It is expected that the histogram counts at the extreme will be zero in virtually all cases and very close to zero in even all but exceptional cases. The Select Case coding jumps out of the counting routine at the first logically correct Case statement. A running total of the histogram is made until the value reaches the acceptable trim (failure) rate, set at step U to 1% of the image data.

The trimming points are found by using a running total. As shown at V, for the lower trim point, the loop starts at the low end of the histogram and works up until the running total is above the acceptable trim rate. The position of the trim point is then readjusted down by one value to bring the running total to just below the acceptable rate. This value is constrained to (−drlm) or greater, regardless of the remote likelihood of such a situation.

At W, the same approach is used for locating the maximum or upper trim point, except that the loop starts at the top of the histogram and works down.

Once the values of the upper and lower trim points are known, then a simple histogram correction of a straight line adjustment from the acceptable trim limits to the image dynamic range limits is made.

In the simplest situation shown in one embodiment X1, the first order corrected data is scaled from the trim limits to the dynamic range. Finally, any data point outside of the dynamic range is trimmed to the full range of the dynamic range limits. This is the full correction of the current invention.

Figure 2:
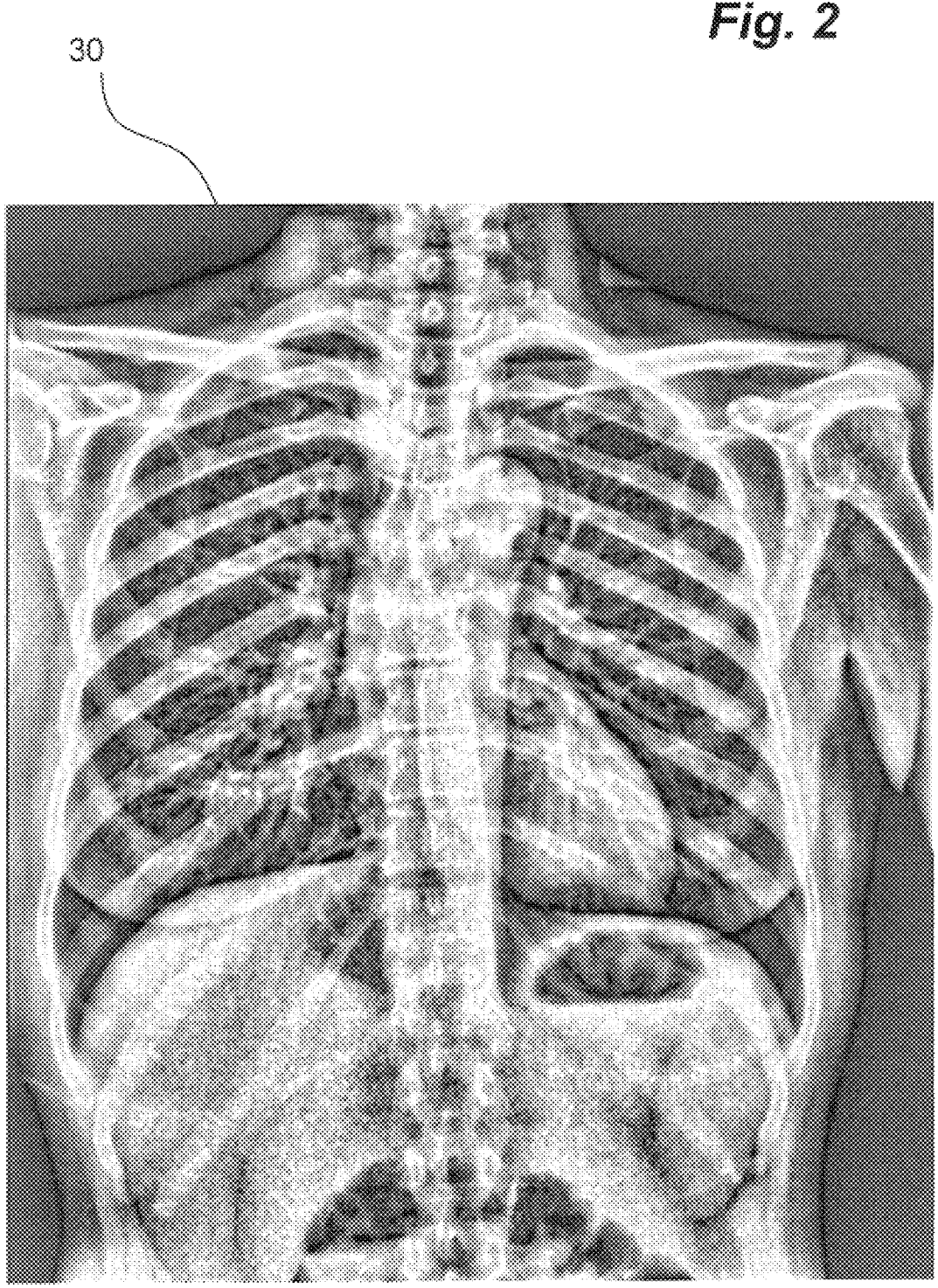
FIG. 2 is a digitally enhanced image of the X-ray of FIG. 1, after application of the preferred method of the present invention.

Each of the new scaled intensity data for each sampled column can be reassembled and the output image is virtually indistinguishable from that in FIG. 2.

While the above, at X1, is a perfectly adequate solution in itself, it has been found empirically that the previously determined trim points are preferably be set to a range different from one exactly set to the dynamic range limits, as human vision is less sensitive in the darker regions. The following modification sets the trim point to 20% and 95% of the dynamic range which leads to the favorable result found in image FIG. 2. It also leads to increased data integrity. FIG. 2 is the result of only about 0.2% or about 1800 of some 880000 points which ended up being trimmed. Normally, code for counting trimmed data would not be included for improved computational efficiency.

At this point, the completely first and second corrected image resides in array imag_wrk4 and can be output to media, such as a magnetic disk, as a standard image file or any other kind of computer file. Also, if incorporated within a software package with a GUI interface, the processed data can be displayed from electronic (RAM) memory to a monitor or other display device.

Image Correction Parameters

The present invention utilizes the input image and two numeric parameters. These parameters have been previously referred to in the sample code and they are:

surf_mdff which holds the minimum allowable difference between surfaces as a Signal to Noise S/N management issue (FIG. 14b, J4); and imag_pcnt which holds the percentage of image size (in both dimensions) to be used for the moving average process (FIG. 14a, F).

If the parameter surf_mdff is set to a value 8, that means that the two extreme surfaces 20+,21+ will be constrained so that they will never be less than 8 units of intensity apart. If surf_mdff is expressed in terms of percent of dynamic range, then 3% of 0–255 becomes 8.

If the parameter imag_pcnt is set to 10% and the image is 2000 by 1500 dots in size, then the moving average filter box dimensions will be set to 200 by 150 dots, all of which are averaged to determine the value for a single low frequency point. Note that this is 30,000 additions per point—thus the need for an efficient algorithm. More exactly, the filter box will be set to 151 by 201 points.

While these two parameters are, in themselves, straightforward enough in concept, Applicant recalls that it was a desired criteria that the user not have to deal with such tasks.

Each of two parameters is independent of the other. The parameter surf_mdff manages noise issues. In this sense, noise is considered to be the more or less random fluctuations of the numeric intensity value at each point. Indeed, surf_mdff is a tolerance with respect to the intensity of any given dot expressed in terms of percent of the dynamic range. The parameter imag_pcnt, on the other hand, represents the area of points to be considered at one instant (the filter box). Expressed in Cartesian coordinates, imag_pcnt is a control for both the x and y axis (the domain) and surf_mdff is a control of the z axis (the range).

Default values can be provided for images which have a known and historical noise component, and thus is taken completely from the hands of the user. Otherwise, general guidelines can assist the non-technical user in specifying the parameter from higher level choices, such as whether the noise in the image is clean, noticeable, or serious to which values for surf_mdff could be specified for the user at 3%, 6% (a typical default), or 12% of the dynamic range limit.

The parameters numeric value is assigned internally in the program by a small lookup table of 3 elements and a multiplication or two. This is a particularly useful approach where the present invention is coded into a GUI and the process is done interactively. The user could estimate the noise level at a glance and then choose from a drop down menu with the above choices. The robustness of the parameter is such that this limited choice of three choices should be perfectly adequate. Note that the details of this scheme are not intending to be limiting but to point the way to a practical implementation.

Regarding the box size parameter, imag_pcnt, its selection and magnitude is primarily an issue of the detail within the image. The more detail in the image, the smaller the moving average filter box must be so that the full dynamic range will be used over smaller areas. As the parameter is also robust, having a low gain, a similar scheme can be used for it. In the context of X-ray images, the following values were determined empirically; for a chest X-ray—5%, for a hand—10% (typical default), or for a leg bone at level of detail at 20% of the image size.

The user can estimate the parameter by simply knowing what the subject was. The robustness of the parameter is such that this limited choice of three should be perfectly adequate.

It is also the case that if the process was not performed in a GUI this straightforward form of parameter estimation will be particularly useful as so little expertise is needed and the "batch processing" style of input can also be made to be easy.

At one extreme, a finer level of choice can be implemented as an option for technically adept or curious and a coarser level of options available for every user. The default evaluations of the user input parameters are also found to produce acceptable results without the user actually being consulted at all.

In any case, it is easy to implement the variables in a way that is humanly understandable so that the user is not required to increase their knowledge of the physics and mathematics of the process.

Figure 20B:
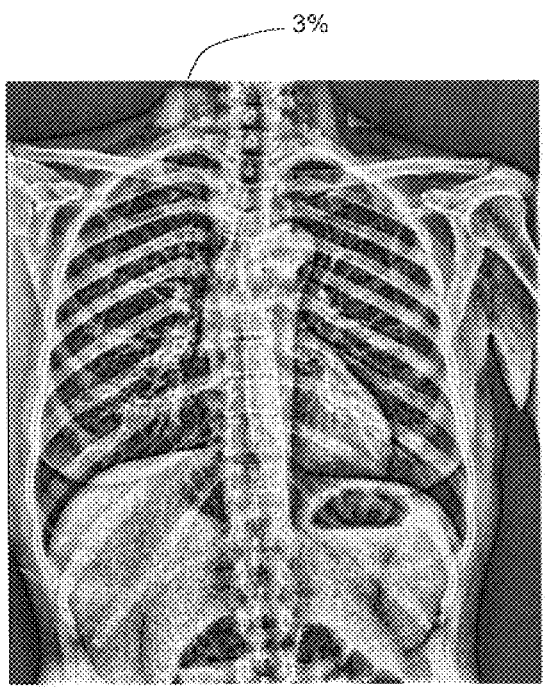
Figure 21:
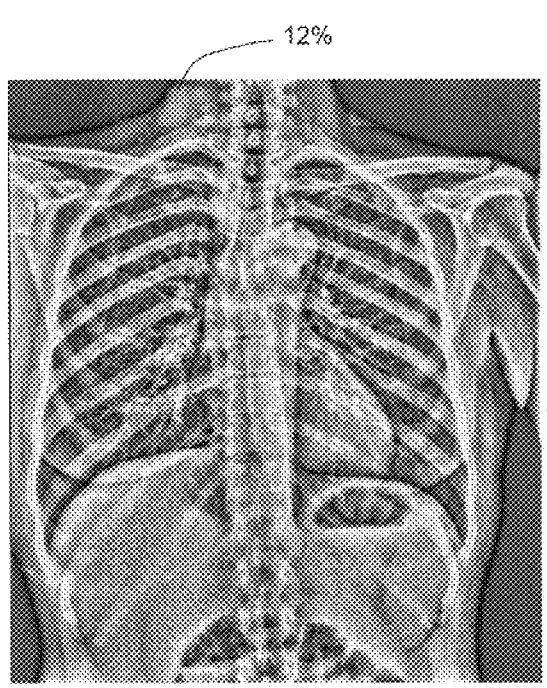

Having reference to FIGS. 19–21, images are presented which are the result of processing the same input image (FIG. 1) with different choices of a value for surf_mdff. FIG. 19 used a surf_mdff value of 1.5%, FIGS. 20a and 20b are identical at 3% and FIG. 21 used 12%. Note that FIGS. 2, 20a and 20b are identical and have been duplicated for comparative purposes only.

The robust nature of the parameter is clearly demonstrated by noticing that it takes a doubling of the parameter to result in a significant effect. The images of FIGS. 19, 20a at 1.5 and 3% respectively are virtually indistinguishable. Likewise, FIGS. 20b and 21 are virtually indistinguishable from each other. Applicant is aware that there are limits as to how far the parameter can be varied.

An increasing surf_mdff value better controls random noise amplification but this also limits the amplification of more subtle effects. In the case of the current example image, subjective analysis finds the FIG. 2 (same as FIGS. 20a,20b) to be the superior correction—based upon random noise being hardly noticeable yet the subtle aspects are still very clear. When the surf_mdff value is smaller the noise amplification becomes less desirable and when the surf_mdff value is higher the subtler aspects experience a reduced amplification as in the case in FIG. 21.

Yet it is also the case that all three images represent a dramatic improvement over FIG. 1 and, thus, any reasonable choice of the surf_mdff value would have yielded a fine result.

Having reference to FIGS. 22–25, images are presented which are the result of processing the same input image (FIG. 1) with different parameter choices for imag pcnt.

Parameter surf_mdff values remain constant but the imag_pcnt value varies. Once again FIG. 2 is used as the reference and has a value of 5% of the image size. For comparative purposes, FIG. 2 has been duplicated as FIG. 22. FIG. 23 uses a filter box at 7% and FIG. 24 at 10%, and FIG. 25 at 20% of image size.

The robust nature of the second, box-size parameter is again clearly demonstrated by the subjective observation that any of FIGS. 22 (FIG. 2), 23, or FIG. 24 are acceptable results. Finally at 20% for FIG. 25, the result pales compared to the others. However, FIG. 25 it is still a good improvement over FIG. 1 and one must keep in mind that to use the value of 20% with this X-ray would represent the worst case of a user possible selections, if so permitted. It is anticipated that diagnosticians would not confuse the differences in detail between a chest and leg image.

The applicant-selected box-size parameter setting of 5% (FIG. 2, 22) and the suggested default setting of 10% (FIG. 24), both gave an excellent result as did the intermediate value of 7% (FIG. 23).

the embodiments of the invention for which an exclusive property or privilege is claimed are defined as follows:

1. A method for maximizing contrast between neighboring points of a data population selected from a digital image, each image point being defined by a position and an intensity, the image having an intensity dynamic range, the method comprising the steps of:

(a) determining a first low frequency trending function which is curve fit to the data population's maximum intensities;

(b) determining a second low frequency trending function, independent from the first trending function, and which is curve fit to the data population's minimum intensities;

(c) establishing a maximum and minimum fairway for the data population bounded by the first and second trending functions; and for each point in the data population, (d) extracting a range of the local minimum and maximum intensity from the fairway;

(e) determining a local scaling factor as the ratio between the dynamic range for the image and the extracted local range; and f) scaling the point by the local scaling factor.

2. The method of claim 1 wherein the point is scaled using the relationship of $$\frac{(\text{Image Point} - \text{Local Minimum})}{(\text{Local Maximum} - \text{Local Minimum})} \text{Dynamic Range}.$$

3. The method of claim 1 wherein one or more outlier points for the data population exist, which have intensities outside the fairway, further comprising the steps of:

(a) scaling each outlier point by the local scaling factor with the result that the scaled intensity is outside the image's dynamic range;

(b) storing the outlier point's scaled intensity at a precision greater than the dynamic range to prevent loss of intensity information;

(c) forming an intensity histogram of the entire data population, the histogram establishing a predetermined lower intensity and a predetermined upper intensity for forming a range which is greater than the dynamic range and which encompasses the intensities of substantially all the outliers;

(d) trimming the intensity histogram of points which have an intensity which is below the predetermined lower intensity, and above the predetermined upper intensity, for establishing a trimmed data population having a trimmed range between minimum and maximum trimmed intensities; and (e) scaling each point of the trimmed data population by the ratio of the trimmed range to the image's dynamic range.

4. The method of claim 2 wherein the data population is adjusted to the greater intensities suited to human vision, further comprising the steps of:

(a) scaling each point of the trimmed data population to an output range less than the image's dynamic range; and (b) offsetting each scaled point by an incremental intensity value which is less than the difference between the dynamic range and the output range so that the scaled points reside in a higher range of intensities which is still within the dynamic range.

5. The method of claim 1 wherein determination of each of the first and second trending functions comprises the steps of:

(a) determining a first function representing the entire data population;

(b) iteratively determining a successive upper function for a residual subset of points of the data population which have intensities greater than the greater of the first function or a previous successive upper function, converging upwardly until fewer than a predetermined number of points are greater than the successive upper function, the converged successive upper function forming the first trending function; and (c) iteratively determining a successive lower function for a residual subset of points of the data population which have intensities lower than the lower of the first function or a previous successive lower function, until fewer than a predetermined residual number of points are lower than the successive lower function, the converged successive lower function forming the second trending function.

6. The method of claim 5 wherein the convergence of one or both of the upper and lower functions is improved by:

(a) determining the differences between the residual subset of points and each successive function in the iteration;

(b) amplifying the differences and adding it to a subset of points to form an exaggerated subset of points; and (c) applying the iterative determination of successive functions to the exaggerated subset of points.

7. The method of claim 6 wherein the differences are amplified by incrementing a counter each iteration and multiplying the differences by the counter.

8. The method of claim 5 wherein one or more of the functions applied to determine each of the first and second trending functions is a moving average.

9. The method of claim 8 wherein the function applied for each of the first, successive upper and successive lower curves is a moving average.

10. The method of claim 8 wherein the moving average has a filter box of predetermined size of a column dimension and a row dimension and which is optimized in two dimensions for the image by:

(a) extending the image at the edges of the image by a number of points complementary to the filter box column and row dimensions;

(b) determining a first sum of the intensities of a one dimensional subset of points, for the size of the filter box, and about each image point along a first column or row dimension;

(c) storing the subset sums, indexed to each point in the image;

(d) determining a second sum of the subset sums, for the size of the filter box, and about each image point along a row or column dimension; and (e) normalizing the second sum by dividing by the number of points in the filter box.

11. The method of claim 10 wherein the image has specified dimensions and the filter box dimensions are set to a percentage of the image dimensions for adjusting the frequency of one or both of the first and second trending functions.

12. The method of claim 11 wherein the filter box dimensions are between about 5 and 20% of the image dimensions.

13. The method of claim 12 wherein the image is an X-ray of a chest and the filter box dimensions are about 5%.

14. The method of claim 10 wherein the local range of the fairway image is constrained to be no narrower than a percentage of the image dynamic range for suppressing noise.

15. The method of claim 14 wherein the minimum range of the fairway image is constrained between about 3 and 12%.

16. The method of claim 15 wherein the minimum range of the fairway image is constrained to about 6%.

17. The method of claim 10 wherein the image is extended at the image edges by mirroring of the image data at the edges.

18. The method of claim 10 wherein (a) the image has specified dimensions and the filter box dimensions are set to a percentage of the image dimensions for adjusting the frequency of one or both of the first and second trending functions;

(b) the local range of the fairway image is constrained to be no narrower than a percentage of the image dynamic range for suppressing noise; and (c) the frequency and noise suppression percentages are adjustable by an diagnostician.

19. A system for maximizing contrast between neighboring points of a data population selected from a digital image, each image point being defined by a position and an intensity, the image having an intensity dynamic range, the system comprising:

(a) means for determining a first low frequency trending function which is curve fit to the data population's maximum intensities;

(b) means for determining a second low frequency trending function, independent from the first trending function, and which is curve fit to the data population's minimum intensities; and (c) means for establishing a maximum and minimum fairway for the data population bounded by the first and second trending functions so that for each point in the data population, a range of the local minimum and maximum intensity from the fairway can be extracted, a local scaling factor can be determined as the ratio between the dynamic range for the image and the extracted local range, and each point can be scaled by local scaling factor.

* * * * *

UNITED STATES PATENT AND TRADEMARK OFFICE
CERTIFICATE OF CORRECTION

PATENT NO.    : 6,633,684 B1
DATED         : October 14, 2003
INVENTOR(S)   : James It is certified that error appears in the above-identified patent and that said Letters Patent is hereby corrected as shown below:

<u>Title page,</u>
Item [73], Assignee, following "Athentech Technologies", please delete "Corp." and insert -- Inc. -- therefor.

Signed and Sealed this

Second Day of March, 2004

JON W. DUDAS
*Acting Director of the United States Patent and Trademark Office*